(12) United States Patent
Tian et al.

(10) Patent No.: US 8,750,387 B2
(45) Date of Patent: Jun. 10, 2014

(54) ADAPTIVE ENCODER-ASSISTED FRAME RATE UP CONVERSION

(75) Inventors: Tao Tian, San Diego, CA (US); Fang Shi, San Diego, CA (US); Vijayalakshmi R. Raveendran, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1422 days.

(21) Appl. No.: 11/558,833

(22) Filed: Nov. 10, 2006

(65) Prior Publication Data

US 2007/0230563 A1 Oct. 4, 2007

Related U.S. Application Data

(60) Provisional application No. 60/789,319, filed on Apr. 4, 2006, provisional application No. 60/795,038, filed on Apr. 25, 2006.

(51) Int. Cl.
*H04N 7/12* (2006.01)
*H04N 7/46* (2006.01)
*H04N 7/26* (2006.01)
*H04N 7/01* (2006.01)

(52) U.S. Cl.
CPC .... *H04N 19/00751* (2013.01); *H04N 19/00127* (2013.01); *H04N 7/0127* (2013.01)
USPC .................................................. 375/240.26

(58) Field of Classification Search
CPC .................. H04N 19/00751; H04N 19/00127; H04N 7/0127
USPC .................................................. 375/240.26
See application file for complete search history.

(56) References Cited

U.S. PATENT DOCUMENTS

| | | |
|---|---|---|
| 3,670,096 A | 6/1972 | Candy et al. |
| 5,168,394 A | 12/1992 | Sasho |

(Continued)

FOREIGN PATENT DOCUMENTS

| | | |
|---|---|---|
| CL | 01532007 | 11/2007 |
| CL | 07862007 | 11/2007 |

(Continued)

OTHER PUBLICATIONS

Dane G., et al., "Encoder-Assisted Adaptive Video Frame Interpolation," Acoustics, Speech, and Signal Processing, 2005. Proceedings. (ICASSP '05). IEEE International Conference on, Philadelphia, PA, Piscataway, NJ, IEEE, vol. 2, Mar. 18, 2005, pp. 349-352.

(Continued)

*Primary Examiner* — Richard Torrente
(74) *Attorney, Agent, or Firm* — Brent A. Boyd

(57) ABSTRACT

Adaptive video encoding and decoding methods and apparatuses for encoder-assisted frame rate up-conversion (EA-FRUC) are described herein. An encoder selectively encodes at least a portion of a video frame, such as a block, using an interpolated FRUC frame as a reference. The encoder interpolates at least a portion of the FRUC frame at the same time instance as the yet to be encoded video frame, and selects one of a plurality of FRUC encoding modes for that portion, e.g., based on rate distortion (RD). The encoder encodes the frame using the selected FRUC encoding mode, the FRUC reference frame, and any additional reference frames that may be indicated. A decoder interpolates the FRUC frame and uses it for decoding with knowledge of the particular FRUC mode that was used by the encoder. The encoder communicates the FRUC mode for a block via one or more existing parameters in the encoded video frame.

40 Claims, 11 Drawing Sheets

(56) References Cited

U.S. PATENT DOCUMENTS

| | | | |
|---|---|---|---|
| 5,198,902 A | 3/1993 | Richards et al. | |
| 5,387,947 A | 2/1995 | Shin | |
| 5,394,196 A | 2/1995 | Robert | |
| 5,784,107 A | 7/1998 | Takahashi | |
| 5,844,616 A | 12/1998 | Collet et al. | |
| 5,995,154 A | 11/1999 | Heimburger | |
| 6,008,865 A | 12/1999 | Fogel | |
| 6,043,846 A * | 3/2000 | Shen et al. | 348/409.1 |
| 6,101,220 A | 8/2000 | Ando | |
| 6,192,079 B1 | 2/2001 | Sharma et al. | |
| 6,208,760 B1 | 3/2001 | De Haan et al. | |
| 6,229,570 B1 | 5/2001 | Bugwadia et al. | |
| 6,229,925 B1 | 5/2001 | Alexandre et al. | |
| 6,330,535 B1 | 12/2001 | Yasunaga et al. | |
| 6,345,247 B1 | 2/2002 | Yasunaga et al. | |
| 6,404,901 B1 | 6/2002 | Itokawa | |
| 6,424,676 B1 | 7/2002 | Kono et al. | |
| 6,480,541 B1 | 11/2002 | Girod | |
| 6,560,371 B1 | 5/2003 | Zhang et al. | |
| 6,597,738 B1 | 7/2003 | Park et al. | |
| 6,618,439 B1 | 9/2003 | Kuo et al. | |
| 6,625,333 B1 | 9/2003 | Wang et al. | |
| 6,654,420 B1 | 11/2003 | Snook | |
| 6,704,357 B1 | 3/2004 | Ketcham | |
| 6,728,317 B1 | 4/2004 | Demos | |
| 7,003,038 B2 | 2/2006 | Divakaran et al. | |
| 7,042,941 B1 * | 5/2006 | Laksono et al. | 375/240.03 |
| 7,075,986 B2 | 7/2006 | Girod | |
| 7,116,716 B2 | 10/2006 | Ma et al. | |
| 7,215,710 B2 | 5/2007 | Yamada et al. | |
| 7,280,708 B2 | 10/2007 | Song et al. | |
| 7,343,044 B2 | 3/2008 | Baba et al. | |
| 7,457,471 B2 | 11/2008 | Song et al. | |
| 7,577,196 B2 | 8/2009 | Ducloux et al. | |
| 2004/0017852 A1 | 1/2004 | Garrido et al. | |
| 2005/0005301 A1 | 1/2005 | Song et al. | |
| 2005/0265451 A1 | 12/2005 | Shi et al. | |
| 2006/0002465 A1 | 1/2006 | Raveendran et al. | |
| 2006/0018383 A1 | 1/2006 | Shi et al. | |
| 2006/0039476 A1 | 2/2006 | Watanabe | |
| 2006/0159359 A1 | 7/2006 | Lee | |
| 2006/0165176 A1 | 7/2006 | Raveendran et al. | |
| 2007/0064800 A1 * | 3/2007 | Ha | 375/240.12 |
| 2007/0230564 A1 | 10/2007 | Chen et al. | |
| 2007/0230578 A1 | 10/2007 | Shi et al. | |
| 2008/0002862 A1 | 1/2008 | Matsugu et al. | |
| 2008/0112606 A1 | 5/2008 | Lee et al. | |
| 2013/0188742 A1 | 7/2013 | Raveendran et al. | |

FOREIGN PATENT DOCUMENTS

| | | |
|---|---|---|
| EP | 0018856 | 11/1980 |
| EP | 0782343 | 7/1997 |
| EP | 0881836 | 12/1998 |
| EP | 0883298 A2 | 12/1998 |
| EP | 1287492 | 3/2003 |
| EP | 1357750 | 10/2003 |
| EP | 1369820 A2 | 12/2003 |
| EP | 1383322 | 1/2004 |
| EP | 1481546 | 12/2004 |
| EP | 1617678 A2 | 1/2006 |
| GB | 2316568 A | 2/1998 |
| JP | 08191448 A | 7/1996 |
| JP | 08223536 A | 8/1996 |
| JP | 8256340 A | 10/1996 |
| JP | 10066033 A | 3/1998 |
| JP | 11112940 A | 4/1999 |
| JP | 11177940 A | 7/1999 |
| JP | H11510937 A | 9/1999 |
| JP | 2000134585 A | 5/2000 |
| JP | 2000512091 | 9/2000 |
| JP | 2003515987 T | 5/2003 |
| JP | 2003274415 A | 9/2003 |
| JP | 2003348596 A | 12/2003 |
| JP | 2004112229 | 4/2004 |
| JP | 2004166183 A | 6/2004 |
| JP | 2005526457 A | 9/2005 |
| JP | 2008526119 A | 7/2008 |
| JP | 2009510937 | 3/2009 |
| JP | 2010136383 A | 6/2010 |
| KR | 1019990082104 | 11/1999 |
| KR | 20030073254 A | 9/2003 |
| RU | 2182727 | 5/2002 |
| RU | 2201654 | 3/2003 |
| TW | 480885 B | 3/2002 |
| WO | WO9216071 A1 | 9/1992 |
| WO | 9728507 | 8/1997 |
| WO | 9746020 A2 | 12/1997 |
| WO | 9746022 A2 | 12/1997 |
| WO | 9922525 A1 | 5/1999 |
| WO | WO0133864 A1 | 5/2001 |
| WO | WO2004025965 A1 | 3/2004 |
| WO | 2006007527 A2 | 1/2006 |
| WO | WO2007115325 | 10/2007 |

OTHER PUBLICATIONS

Kim et al.,: A new video interpolation technique based on motion-adaptive subsampling This work was supported by Jeoju University, Korea. IEEE Transactions on Consumer Electronics, IEEE Service Center, New York, U.S. LNKD-DOI:10.1109/30.793602, vol. 45, No. 3, Aug. 1, 1999, pp. 782-787, XP011083800.

Taiwanese Search report—096112143—TIPO—Jul. 27, 2010.

"Rate-Constrained Coder Control and Comparison of Video Coding Standards," IEEE Transactions on Circuits and Systems Fo Video Technology, vol. 13, No. 7, pp. 688-703, (Jul. 2003).

TIA-1099 "Forward Link Only Air Interface Specification for Terrestrial Mobile Multimedia Multicast" Aug. 2006.

Written Opinion—PCT/US2007/065547, International Search Authority-European Patent Office—Sep. 7, 2007.

International Preliminary PCT/US2007/065547, International Search Authorty—The International Bureau fo WIPO—Geneva, Switzerland—Oct. 8, 2008.

A. Kaup et al.: "Efficient prediction of uncovered background in inter-frame coding using spatial extrapolation" in Proc. ICASSP, vol. 5, pp. 501-504, 1994.

Fukunaga et al.: "MPEG-4 Video Verification Model Version 16.0", Internation Organization for Standarization-Organization Internationale de Normalisation, vol. N3312, Mar. 2000, pp. I-380, XP000861688 Section 3.7, pp. 81-88.

G. Dane and T.Q. Nguyen, "Motion vector processing for frame rate up conversion" in IEEE international Conference on Acoustics, Speech, and Signal Processing, pp. 309-312, May 2004.

Gallant et al.: "Efficient scalable DCT-based video coding at low bit rates", Image Processing. 1999. IC 99. International Conference on Kobe, Japan Oct. 24-28, 1999, Piscataway, NJ, USA, IEEE, US, vol. 3, Oct. 24, 1999, pp. 782-786, XP010368741.

Liu et al.: "MCI-Embedded Motion-Compensated Prediction for Quality Enhancement of Frame Interpolation", Proceedings of the SPIE—The International Society for Optical Engineering, Multimedia Systems and Applications III, vol. 4209, Nov. 6, 2000, pp. 251-261, XP002351712, Boston, MA, USA, 2001, abstract, Section 1, pp. 251-252, Section 2, pp. 253-254, Section 4, pp. 256-257.

Puri et al.: "An Interframe Coding Scheme for Packet Video", Proceedings of the SPIE. Belingham, VA, US, vol. 1199, no. Part 3, Nov. 8, 1989, pp. 1610-1619, XP000568683, abstract section 3, p. 1611 Section 5, pp. 1612-1613 with figures 2 and 4.

Puri et al.: "Video Coding with Motion-Compensated Interpolation for CD-ROM Applications", Signal Processing Image Communication, Elsevier Science Publishers, Amsterdam, NL vol. 2, No. 2. Aug. 1, 1990, pp. 127-144, XP000243473 abstract section 4, pp. 130-132.

R. Thoma et al.: "Motion compensating interpolation considering covered and uncovered background", Signal Processing: Image Compression 1, pp. 191-212, 1989.

Sasai et al.: "B-Picture Coding with Motion-Compensated Frame Rate up Conversion", Proceedings of the SPIE—The International Society for Optical Engineering, Image and Video Communications

(56) References Cited

OTHER PUBLICATIONS and Processing 2005, vol. 5685, Jan. 18, 2005, p. 792-800, XP002351713 San Jose, CA, USA, 2005 abstract Sections 3.1 and 3.3.
Sulivan et al.: "Rate-Distortion Optimization for Video Compression", IEEE Signal Processing Magazine. IEEE Service Center, Piscataway, NJ, US, vol. 15, No. 6, Nov. 1998, pp. 74-90, XP001064929, Sub-section "Distortion Measures", pp. 78-79 Sub-section "Optimization Techniquest", pp. 80-81 Sub-sub-section Variable Block Sizes, p. 82, paragraph entitled "Case 1", p. 82 Sub-section "Intra/Inter/Skip Mode Decision", pp. 84-85 Sub-section "Comparison to Other Encoding Strategies", pp. 87-88.
T. Kuo et al.: "Motion-compensated interpolation for low-bit-rage video quality enhancement" in Proc. SPIE Applications of Digital Image Processing, vol. 3460, p. 277-288, 1998.
Thomas Wiegand: "Joint Model No. 1, Revision 1 (JM-IRL)", ITU Study Group 16—Video Coding Experts Group, Dec. 3, 2001, pp. 1,3-75, XP001086627 Section 5, pp. 40-44 Appendix I, pp. 50-57.
Flierl et al., "Generalized B Pictures and the Draft H.264/AVC Video-Compression Standard", IEEE Trans. Circuit and Systems for Video Technology, vol. 13, No. 7, pp. 587-597, 2003.
Liu et al., "Adaptive Video Multicast over the Internet", IEEE Computer Society, 2003, pp. 22-33.
Bruijn et al., Efficient Video Coding Integrating MPEG-2 and Picture-Rate Conversion, IEEE Transactions on Consumer Electronics, IEEE Service Center, New York, NY, USA, vol. 48, No. 3, Aug. 2002, pp. 688-693,XP002312635.
Castagno R., et al., "A Method for Motion Adaptive Frame Rate Up-Conversion," IEEE Transactions on Circuits and Systems for Video Technology, IEEE Service Center, Piscataway, NJ, vol. 6, No. 5, Oct. 1996, pp. 436-445.
Inazumi Y., et al., "Estimation of the Optimal Frame Rate for Video Communications Under Bit-Rate Constraints," Electronics & Communications in Japan, Part 1—Communications, Scripta Technica. New York, vol. 86, no. Dec. 2003, pp. 54-67.12, Pant.
Pyun J-Y, et al., "Scene-Adaptive Frame-Layer Rate Control for Low Bit Rate Video,"—IEICE Transactions on Fundamentals of Electronics, Communications and Computer Sciences, Institute of Electronics Information and Comm. Eng. Tokyo, JP, vol. E86-A, No. 10, Oct. 2003, pp. 2618-2622.
Sasai H., et al., "Frame-rate up-conversion using reliable analysis of transmitted motion information," Acousitcs, Speech, and Signal Processing, 2004. Proceedings. ICASSP '04, IEEE International Conference on Montreal, Quebec, Canada, vol. 5, May 17, 2004, pp. 257-260.
Tao Chen Ed—Institute of Electrical and Electronics Engineers: "Adaptive temporal interpolation using bidirectional motion estimation and compensation," Proceedings 2002 International Conference on Image Processing. ICIP2002.Rochester, NY, Sep. 22-25, 2002, International Conference on Image Processing, New York, IEEE, vol. 2 of 3, Sep. 22, 2002, pp. 313-316.
Schwarz H et al., "Combined Scalability Support for the Scalable Extension of H.264/AVC," Multimedia and Expo, 2005. ICME 2005. IEEE International Conference on Amsterdam, The Netherlands Jul. 6-6, 2005, Piscataway, NJ, USA, IEEE, Jul. 6, 2005, pp. 446-449.
Schwarz H et al., "MCTF and Scalability Extension of H.264/AVC," Internet Citation, [Online] Dec. 15, 2004, URL: http://ip.hhi.de/imagecom_G1/savce/documents/PCS2004.pdf>.
"Advanced Video Coding for Generic Audiovisual Services," ITU-T Standard Pre-Published (P), International Tlecommunication Union, Geneva, No. H264 3/5, Mar. 1, 2005.
Ghandi M. et al., "Layered H.264 Video Transmission with Hierarchical QAM" [Online] May 1, 2005, pp. 1-17, URL:http://mahdi/ghandi.ws/papers/jvcir06.pdf>.
Telecommunication Standarization Sector of ITU: "Recommendation H.264 Advanced Video Coding for Generic Audiovisual Services," ITU-T Recommendations, International Telecommendation Union, Geneva, CH, No. H264, Mar. 2005.
ISR—PCT/US2007/065550, dated Aug. 22, 2007.
ISR—PCT/US2007/065547, dated Sep. 7, 2007.
A.M. Tekalp, "Digital Video Processing", Oppenheim, ed, Prentice Hall Signal Processing Series, Upper Saddle River, NJ 1995.
Lee S-H et al: "Weighted-adaptive motion-compensated frame rate up-conversion", IEEE Transactions on Consumer Electronics, IEEE Service Center, New York, NY, US, vol. 49, No. 3, Aug. 1, 2003, pp. 485-492, XP002290775, ISSN: 0098-3063, DOI: 10.1109/TCE.2003.1233759.
Sung-Hee Lee et al: "Adaptive motion-compensated interpolation for frame rate up-conversion" IEEE Transactions on Consumer Electronics, vol. 48, No. 3, Aug. 2002, pp. 444-450.
Yoshiritsu Hatori, et al.,. (written by), Digital Image Network, 1st edition, The Institute of Image Information and Television Engineers (edited by), Kabushiki Kaisha Koronasha, Dec. 25, 2002, pp. 22 to 23, ISBN: 4-339-01262-9.
Institute of Image Information and Television Engineers (edited by), Kabushiki Kaisha Koronasha, Dec. 25, 2002, pp. 22 to 23, ISBN: 4-339-01262-9.
Hur J.H., et al.,"H. 264 to MPEG-4 Transcoding Using Block Type Information," Proceedings of the 2005 IEEE Region 10 Conference (TENCON 2005), 2005, pp. 1-6, ISBN: 0-7803-9311-2.
Kikuchi Y., et. al., "Improved multiple frame motion compensation using frame interpolation", Joint Video Team(JVT) of ISO/IEC MPEG & ITU-TVCEG (ISO/IEC JTC1/ SC29/WG11 and ITU-T SG16 Q.6), Document: JVT-B075, Jan. 29-Feb. 1, 2002, [online] Jan. 17, 2005, <URL:http://wftp3.itu.int/av-arch/jvt-site/2002_01_Geneva/JVT-B075.doc>.
Ono S., et al., "Ubiquitous Technology: High Efficiency Encoding of Dynamic Images—MPEG-4 and H.264 ," Japan, Ohmsha Ltd., Apr. 20, 2005, 1st ed., Nos. 61-63 and 67, pp. 129, ISBN: 4-274-20060-4.
Sekiguchi S., et al., "Study of Dynamic Network-Adaptive Transcoder," Proceedings of the 66th (2004) National Conference of the Information Processing Society of Japan, The Information Processing Society of Japan, Mar. 9, 2004, vol. 5, pp. 201-204.
Wiegand T., "H.26L Test Model Long-Term No. 9 (TML-9) draft0", ITU—Telecommunications Standardization Sector Study Group 16 Video Coding Experts Group (VCEG), Document VCEG-N83 d1, 2001.

\* cited by examiner

ADAPTIVE ENCODER-ASSISTED FRAME RATE UP CONVERSION

CLAIM OF PRIORITY UNDER 35 U.S.C. §119

This application claims the benefit of U.S. Provisional Application No. 60/789,319, filed Apr. 4, 2006, the entire content of which is incorporated herein by reference, and U.S. Provisional Application No. 60/795,038, filed Apr. 25, 2006, the entire content of which is incorporated herein by reference.

REFERENCE TO CO-PENDING APPLICATION

This application is related to U.S. patent application Ser. No. 11/558,867, entitled "Apparatus and Method of Enhanced Frame Interpolation in Video Compression," filed on the same date as this application, and assigned to the assignee of this application, the entire content of which is incorporated herein by reference.

TECHNICAL FIELD

This disclosure relates to digital video encoding and decoding and, more particularly, techniques for interpolation of video frames.

BACKGROUND

Digital video capabilities can be incorporated into a wide range of devices, including digital televisions, digital direct broadcast systems, wireless communication devices, personal digital assistants (PDAs), laptop computers, desktop computers, video game consoles, digital cameras, digital recording devices, cellular or satellite radio telephones, and the like. Digital video devices can provide significant improvements over conventional analog video systems in processing and transmitting video sequences.

Different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC). These video encoding standards support improved transmission efficiency of video sequences by encoding data in a compressed manner.

Various video encoding standards support video encoding techniques that utilize similarities between successive video frames, referred to as temporal or Inter-frame correlation, to provide Inter-frame compression. The Inter-frame compression techniques exploit data redundancy across frames by converting pixel-based representations of video frames to motion representations. Frames encoded using Inter-frame techniques are referred to as P ("predictive") frames or B ("bi-directional") frames. Some frames, referred to as I ("intra") frames, are encoded using spatial compression, which is non-predictive.

SUMMARY

This disclosure describes adaptive video encoding and decoding techniques for encoder-assisted frame rate up-conversion (EA-FRUC). According to the disclosed techniques, an encoder selectively encodes a video frame, such as a B frame or other predictive frame, or a region of such a video frame, such as a block, using an interpolated FRUC frame as a reference. The encoder interpolates the FRUC frame at the same time instance as the yet to be encoded video frame, and selects one of a plurality of FRUC encoding modes, e.g., based on a rate distortion (RD) optimization decision. The encoder then encodes at least a portion of the frame, e.g., a block in the frame, using the selected FRUC encoding mode, the FRUC reference frame, and any additional reference frames that may be indicated.

A decoder interpolates the FRUC frame and uses it to decode the encoded frame or portion thereof with knowledge of the particular FRUC mode that was used by the encoder. The encoder communicates the FRUC mode via one or more existing parameters in the encoded video frame. In this manner, the encoding mode can be communicated to the decoder for use in decoding the encoded video frame efficiently without consuming substantial, additional bandwidth. Use of FRUC reference frames and communication of FRUC encoding modes permit the encoder and decoder to more effectively balance coding efficiency and visual quality.

In one aspect, the disclosure provides a digital video encoding method comprising interpolating a frame rate up-conversion (FRUC) video frame, encoding at least a portion of a video frame using the FRUC frame as a reference, selecting one of a plurality of FRUC modes for the at least a portion of the encoded video frame, and adjusting one or more parameters for the at least a portion of the encoded video frame to indicate the selected FRUC mode.

In another aspect, the disclosure provides a digital video encoding apparatus comprising an interpolation module that interpolates a frame rate up-conversion (FRUC) video frame, an encoding module that encodes at least a portion of a video frame using the FRUC frame as a reference, a mode selection module that selects one of a plurality of FRUC modes for the at least a portion of the encoded video frame, and a signaling module that adjusts one or more parameters for the at least a portion of the encoded video frame to indicate the selected FRUC mode.

In an additional aspect, the disclosure provides a processor for encoding digital video data, the processor being configured to interpolate a frame rate up-conversion (FRUC) video frame, encode at least a portion of a video frame using the FRUC frame as a reference, select one of a plurality of FRUC modes for the at least a portion of the encoded video frame, and adjust one or more parameters for the at least a portion of the encoded video frame to indicate the selected FRUC mode.

In a further aspect, the disclosure provides a digital video decoding method comprising interpolating a frame rate up-conversion (FRUC) video frame, selecting one of a plurality of FRUC modes to decode at least a portion of an encoded video frame based on one or more parameters for the at least a portion of the encoded video frame that indicate the selected FRUC mode, and decoding the at least a portion of the encoded video frame according to the selected FRUC mode using the interpolated FRUC frame as a reference.

In another aspect, the disclosure provides a digital video decoding apparatus comprising an interpolation module that interpolates a frame rate up-conversion (FRUC) video frame, a mode selection module that selects one of a plurality of FRUC modes to decode at least a portion of an encoded video frame based on one or more parameters for the at least a portion of the encoded video frame that indicate the selected FRUC mode, and a decoding module that decodes the at least a portion of the encoded video frame according to the selected FRUC mode using the interpolated FRUC frame as a reference.

In another aspect, the disclosure provides a processor for decoding digital video data, the processor being configured to interpolate a frame rate up-conversion (FRUC) video frame, select one of a plurality of FRUC modes to decode at least a portion of an encoded video frame based on one or more parameters for the at least a portion of the encoded video frame that indicate the selected FRUC mode, and decode the at least a portion of the encoded video frame according to the selected FRUC mode using the interpolated FRUC frame as a reference.

The techniques described in this disclosure may be implemented in a digital video encoding and/or decoding apparatus in hardware, software, firmware, or any combination thereof. If implemented in software, the software may be executed in a computer. The software may be initially stored as instructions, program code, or the like. Accordingly, the disclosure also contemplates a computer program product for digital video encoding comprising a computer-readable medium, wherein the computer-readable medium comprises codes for causing a computer to execute techniques in accordance with this disclosure.

Additional details of various aspects are set forth in the accompanying drawings and the description below. Other features, objects and advantages will become apparent from the description and drawings, and from the claims.

DETAILED DESCRIPTION

Figure 1:
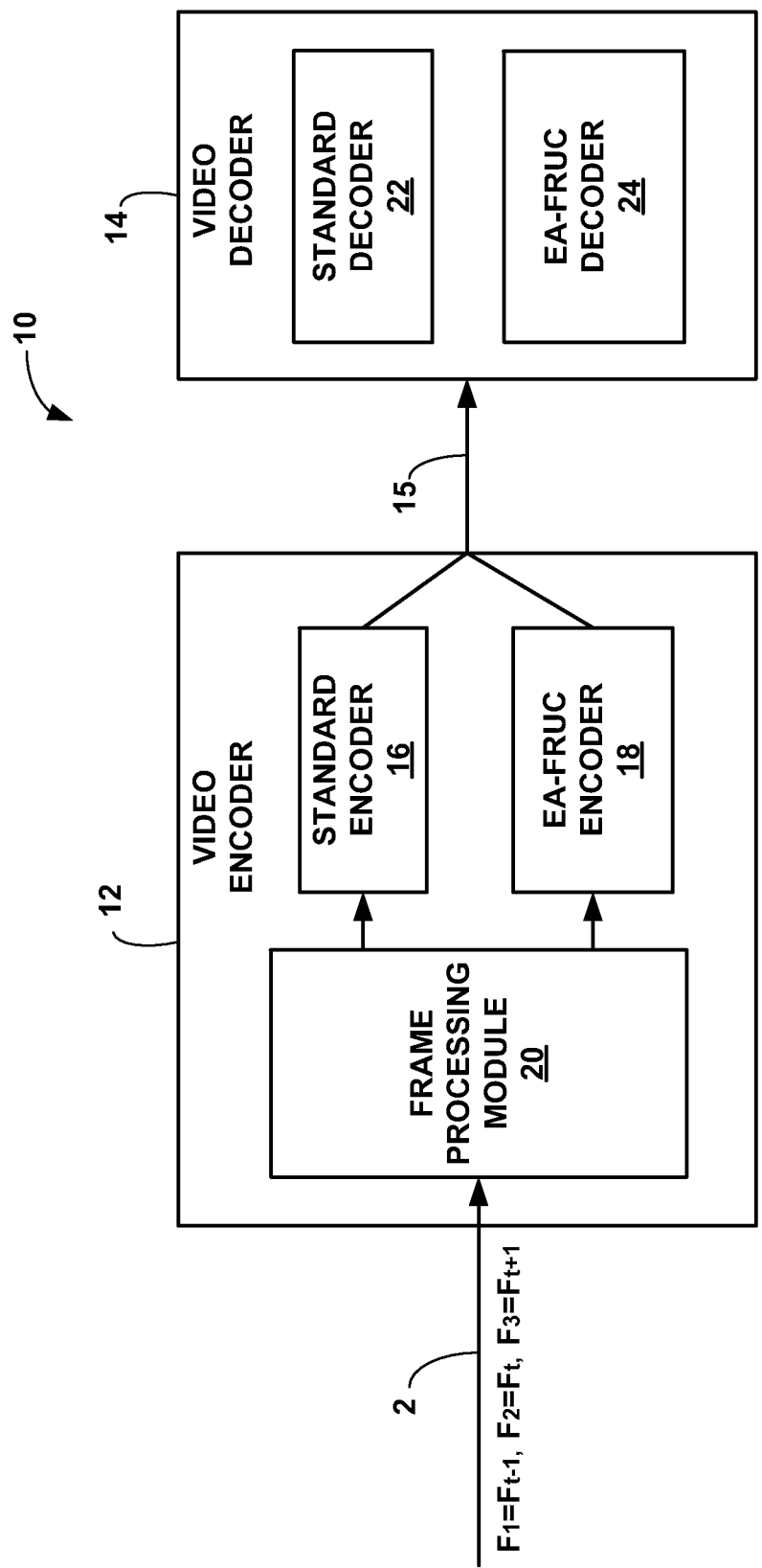
FIG. 1 is a block diagram illustrating a video encoding and decoding system employing an encoder-assisted-frame rate up-conversion (EA-FRUC) technique in accordance with this disclosure.

This disclosure describes adaptive video encoding and decoding techniques for encoder-assisted frame rate up-conversion (EA-FRUC). According to the disclosed techniques, an encoder selectively encodes a video frame, such as a B frame or other predictive frame, or a portion of such a video frame such as a block, using an interpolated FRUC frame as a reference. The encoder interpolates the FRUC frame at the same time instance as the yet to be encoded video frame, and selects one of a plurality of FRUC encoding modes, e.g., based on a rate distortion (RD) optimization decision. The FRUC encoding mode may apply to the frame or a portion of the frame, such as a macroblock (MB) or sub-partition or sub-block of a macroblock, each of which may be referred to generally as a block in this disclosure. The encoder then encodes the frame or portion thereof using the selected FRUC encoding mode, the FRUC reference frame, and any additional reference frames that may be indicated.

A decoder interpolates the FRUC frame and uses it to decode the encoded frame or portion thereof with knowledge of the particular FRUC mode that was used by the encoder. The encoder communicates the FRUC mode via one or more existing parameters in the encoded video frame. For example, parameters for a macroblock may be used to communicate a FRUC mode for the macroblock. In this manner, the encoding mode can be communicated efficiently to the decoder for use in decoding the encoded video frame without consuming substantial, additional bandwidth. Use of FRUC reference frames and communication of FRUC encoding modes permit the encoder and decoder to more effectively balance coding efficiency and visual quality.

The encoder may, for example, adjust a coded block pattern (CBP) parameter and/or a motion vector (MV) parameter associated with a macroblock or sub-partition, i.e., a block, in the encoded video frame to identify the selected FRUC mode for that block. Each of these parameters includes a bit that can be set to zero or a nonzero value. Accordingly, a first mode can be indicated by setting the CBP parameter to zero and the MV parameter to zero, a second mode can be indicated by setting the CBP parameter to a nonzero value and the MV parameter to zero, a third mode can be indicated by setting the CBP parameter to zero and the MV parameter to a nonzero value, and a fourth mode can be indicated by setting the CBP parameter and the MV parameter to a nonzero value. Although four FRUC modes are described in this disclosure for purposes of example, additional or alternative modes may be specified with the CBP and MV parameters, and/or with additional combinations of the CBP, MV, and other parameters.

Using such parameters, or similar parameters, FRUC modes used to encode blocks in a video frame that make use of a FRUC frame as a reference can be communicated effectively and efficiently to a decoder for use in decoding. For each of the FRUC modes, the encoder may encode the pertinent block in the video frame with different motion compensation information, e.g., residual data and motion vectors. As an example, no motion compensation information may be encoded for the first FRUC mode, motion vector information may be encoded for the second FRUC mode, residual information may be encoded for the third mode, and residual information and motion vector information may be encoded for the fourth mode.

A decoder decodes the encoded video frames by examining the parameters embedded in the encoded video frame, e.g., CBP and MV, to identify the selected FRUC mode used to encode the blocks in the video frame. Using the parameters, the decoder can determine for which frames or portions thereof a FRUC frame should be interpolated and how to decode an encoded video frame or portion thereof using the FRUC frame as a reference. In this manner, the decoder can selectively decode video blocks in a frame by selecting using standard decoding operations and EA-FRUC decoding operations, as specified by the encoder.

FIG. 1 is a block diagram illustrating a video encoding and decoding system 10 employing an adaptive encoder-assisted-frame rate up-conversion (EA-FRUC) technique in accordance with an aspect of this disclosure. As shown in FIG. 1, system 10 includes a video encoder 12 and a video decoder 14 connected by a transmission channel 15. Transmission channel 15 may be a wired or wireless medium. System 10 may support bi-directional video transmission, e.g., for video telephony. Accordingly, reciprocal encoding, decoding, multiplexing (MUX) and demultiplexing (DEMUX) components may be provided on opposite ends of channel 15. Alternatively, video encoder 12 may form part of a video broadcast device that broadcasts or streams video to one or more subscriber devices over a wired or wireless media. In various aspects, encoder system 12 and decoder system 14 may be embodied within video communication devices such as wireless mobile terminals equipped for video streaming, video telephony, or both.

System 10 may support video telephony of video streaming according to the Session Initiated Protocol (SIP), ITU-T H.323 standard, ITU-T H.324 standard, or other standards. Video encoder 12 generates encoded video data according to a video compression standard, such as MPEG-2, MPEG-4, ITU-T H.263, or ITU-T H.264. Although not shown in FIG. 1, video encoder 12 and video decoder 14 may be integrated with an audio encoder and decoder, respectively, and include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In some aspects, this disclosure contemplates application to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). The FLO Specification includes examples defining bitstream syntax and semantics and decoding processes suitable for delivering services over the FLO Air Interface. However, the EA-FRUC techniques are not limited to any particular type of broadcast, multicast system, or point-to-point system.

Video encoder 12 and video decoder 14 may be implemented as one or more processors, digital signal processors, application specific integrated circuits (ASICs), field programmable gate arrays (FPGAs), discrete logic, software, hardware, firmware or any combinations thereof The illustrated components of video encoder 12 and video decoder 14 may be included in one or more encoders or decoders, either of which may be integrated as part of a combined encoder/decoder (CODEC) in a respective subscriber device, broadcast device, server, or the like. In addition, video encoder and decoder 12, 14 may include appropriate modulation, demodulation, frequency conversion, filtering, and amplifier components for transmission and reception of encoded video, including radio frequency (RF) wireless components and antennas, as applicable. For ease of illustration, however, such components are not shown in FIG. 1.

Encoder 12 selectively encodes video frames of input source video source stream 2 based on the video content of the frames. The plurality of frames may include one or more intra ("I") frames that are encoded without reference to other frames, predictive ("P") frames encoded with reference to temporally prior frames, and/or bi-directional ("B") frames that are encoded with respect to temporally prior and/or future frames. In addition, individual blocks in such frames may be encoded as I, P or B blocks. Encoder 12 encodes a plurality of video frames according to the EA-FRUC techniques described in this disclosure.

Encoder 12 performs EA-FRUC to interpolate FRUC frames that are used as reference frames for encoding corresponding video frames. Specifically, encoder 12 interpolates a FRUC frame that is used as a reference for a video frame at the same time index, i.e., same time instance, as the video frame. In this manner, EA-FRUC enables encoder 12 to predictively encode a video frame with a reduced size because the corresponding FRUC frame may be a closer match to the yet to be encoded video frame than the other video frames that would otherwise be used as references for encoding the video frame. In addition to encoding the video frame using the FRUC frame as a reference, however, encoder 12 also selectively encodes each of the blocks in the video frame according to one of a plurality of FRUC modes. Encoder 12 may select the FRUC modes for encoding the blocks in the video frame based on a rate-distortion (RD) optimization decision to balance requirements of coding bitrate and visual quality loss.

Encoder 12 encodes a block in a video frame with different motion compensation information, e.g., residual data and motion vectors, based on the selected FRUC mode. As an example, no motion compensation information may be encoded in block for a first FRUC mode, motion vector information may be encoded for a second FRUC mode, residual information may be encoded for a third mode, and residual information and motion vector information may be encoded for a fourth mode. In this manner, encoder 12 may select different FRUC modes to reduce effective bit rate if visual quality is acceptable, or increase effective bit rate if visual quality requires improvement.

The above FRUC modes are described for purposes of example. Additional FRUC modes may be provided. In addition, alternative FRUC modes may be provided. As one example, an alternative FRUC mode may combine any of the above FRUC modes with one or more normal bidirectional (B) MB modes that are known in the art of predictive video encoding. Therefore, the total combination of EA-FRUC modes may be more than four modes, and/or the four modes may include one or more alternative modes combining the FRUC modes described herein with a normal B mode.

Encoder 12 communicates the selected FRUC mode to decoder 14 by adjusting existing parameters of the encoded video frame, e.g., parameters associated with blocks in this frame, such as CBP and MV parameters. This can be achieved, for example, by using bits provided by the existing parameters to indicate which one of the FRUC modes was used to encode each block in the video frame. In this manner, encoder 12 can communicate the selected FRUC mode without increasing the encoding size of the video frame. Instead, encoder 12 can utilize parameter values that would otherwise be present in the encoded video frame, thereby communicating FRUC mode information without consuming a substantial number of additional coding bits, while permitting conversation of coding bits through the use of a FRUC scheme.

In the example of FIG. 1, video encoder 12 includes a frame processing module 20, a standard encoder 16, and an EA-FRUC encoder 18. Frame processing module 20 is configured to process input source video stream 2. Frame processing module 20 may be configured to process incoming video frames according to a fixed group of pictures (GOP) pattern, such as IBPBPBP. Frame processing module 20 may alternatively be configured to process incoming video frames according to an adaptive GOP pattern in which multiple B frames are encoded between each P frame based on the video content. In any case, frame processing module 20 determines whether to encode incoming video frames, e.g., $F_1$, $F_2$, and $F_3$, using standard techniques or using the adaptive EA-FRUC techniques described in this disclosure. In FIG. 1, $F_2$ represents a B frame, while frames $F_1$ and $F_3$ represent previous and subsequent P frames, respectively, that are used as reference frames for encoding frame $F_2$.

Standard encoder 16 encodes P frames and I frames, such as $F_1$ and $F_3$, using standard encoding techniques. EA-FRUC encoder 18 may encode at least a portion of each bidirectional (B) predictive video frames, such as $F_2$, according to the adaptive EA-FRUC techniques described in this disclosure. In particular, EA-FRUC encoder 18 may selectively encode each of the blocks in $F_2$ according to one of a plurality of FRUC modes and with reference to an interpolated FRUC frame to balance the requirements of coding bitrate and visual quality loss.

In order to selectively encode a block within frame $F_2$ according to one of the FRUC modes, EA-FRUC encoder 18 first interpolates a FRUC frame at the same time index as $F_2$. The FRUC frame is a predictive frame that temporally resides between frame $F_1$ and frame $F_3$ and relies on its two neighboring frames $F_1$ and $F_3$ as reference frames, in the same manner as an ordinary B frame. EA-FRUC encoder 18 interpolates the FRUC frame using the same FRUC process that is employed in decoder 14. That is, EA-FRUC encoder 18 may interpolate the FRUC frame, for example, using the neighboring P frames $F_1$ and $F_3$. Accordingly, the FRUC frame corresponding to $F_2$ may be interpolated from $F_1$ and $F_3$. Interpolation may be based on frame averaging, frame repetition or other interpolation techniques.

As described above, the EA-FRUC process encodes at least a portion of the video frame $F_2$ using a corresponding portion of an interpolated FRUC frame generated at the same time instance as video frame $F_2$. It is known that decoder 14 will be able to interpolate the FRUC frame at the decoder side. Therefore, it is also known that the FRUC frame will then be available at the decoder side for use in decoding frame $F_2$. On this basis, the FRUC frame can then be used as a reference frame for frame $F_2$.

Encoding at least a portion of the video frame using the interpolated FRUC frame as a reference can reduce the size of the encoded data for the video frame because the reference data of the FRUC frame may be a closer match than the reference frames $F_1$ and $F_3$ that would otherwise be used for encoding the video frame. As a result, the motion compensation information, e.g., motion vectors and residual data, encoded in the video frame $F_2$ can be reduced or even eliminated if the FRUC frame is an exact or sufficiently close match to the yet to be encoded video frame $F_2$. EA-FRUC enables the encoder 12 to predict the ability of decoder 14 to perform FRUC and exploit this to omit data from the encoded video frame $F_2$ that can be obtained from the interpolated FRUC frame at the decoder. Consequently, EA-FRUC can improve compression ratios and transmission bandwidths across channel 15.

After the FRUC frame is generated for $F_2$, EA-FRUC encoder 18 performs motion estimation for each of the "possible" reference frames. In this case, the "possible" reference frames include the FRUC frame interpolated at the same time instance as the to be encoded video frame $F_2$, reference frames previous to the to be encoded video frame $F_2$ in time, subsequent to the to be encoded video frame $F_2$ in time, or both the previous and subsequent reference frames, e.g., $F_1$ and $F_3$. The possible reference frames may be temporally ordered in one or more buffers or lists. For example, a backward reference buffer may include one or more reference frames subsequent to the to be encoded video frame $F_2$ in time, e.g., frame $F_3$. A forward reference buffer may include reference frames prior to the to be encoded video frame in time. When EA-FRUC encoder 18 interpolates a FRUC frame at the same time instance as the to be encoded video frame $F_2$, the FRUC frame is also included in the forward reference frame as is described in greater detail in FIG. 3. With respect to FIG. 1, the forward reference buffer for $F_2$ includes $F_1$ and the FRUC frame interpolated at the same time index as $F_2$, and the backward reference buffer includes $F_3$.

For normal video encoding, i.e., non-FRUC video encoding, the number of previously reference frames to be considered for encoding is N. i.e., the number of non-interpolated reference frames in the forward reference frame buffer. The particular reference frame which the video frame is encoded with reference to is specified in an encoding data field, e.g., by specifying which of the reference frames, 0 to N−1, is the reference frame of interest. To indicate that the video frame or a portion thereof is encoded with reference to the FRUC frame interpolated at the encoder, EA-FRUC encoder 18 may set the encoding field to N for the forward reference buffer. By setting the encoding field to N. i.e., one higher than is possible for "normal" video encoding, the encoding data field can be used to indicate EA-FRUC encoding without increasing the encoding size for the video frame. In other words, the same encoding field can be used to indicate encoding based on an interpolated FRUC frame or a non-interpolated reference frame.

In order to determine which of the FRUC modes to use for encoding a block in frame $F_2$, EA-FRUC encoder 18 may perform motion estimation using the interpolated FRUC frame for $F_2$ for each of the FRUC modes. EA-FRUC encoder 18 also may perform motion estimation for each of the non-interpolated reference frames included in the forward and backward reference buffers, i.e., $F_1$ and $F_3$ with respect to $F_2$. EA-FRUC encoder 18 selects the mode, i.e., a standard mode or one of a plurality of FRUC modes, for encoding a block in $F_2$ based on an RD optimization decision. That is, EA-FRUC encoder 18 may be configured to select the encoding mode that minimizes a RD cost function. The RD optimization decision may utilize an RD function that comprises a measure of trade-offs between encoding size and distortion using motion vectors and residuals of the encoded frame or portion thereof and corresponding estimates of the resulting image distortion. EA-FRUC encoder 18 may use other suitable cost functions known in the art, such as smallest residue functions and sum of absolute difference (SAD) functions.

If a standard mode is selected to encode a given block in frame $F_2$, i.e., if the block in $F_2$ is encoded using one or more of the non-interpolated frames (e.g., $F_1$ and $F_3$) as a reference, EA-FRUC encoder 18 encodes the block in frame $F_2$ to generate a standard compliant bitstream. However, if one of the FRUC modes is selected to encode the block in $F_2$, i.e., if the $F_2$ block is encoded using the FRUC frame as a reference, EA-FRUC encoder 18 may generate a proprietary bitstream. The proprietary bitstream enables decoder 14 to determine which of the FRUC modes was used for encoding a corresponding block in video frame $F_2$, and then use that same FRUC mode to decode the block in video frame $F_2$.

EA-FRUC encoder 18 adjusts one or more existing parameters or data fields to indicate which one of the plurality of FRUC modes was used for encoding the corresponding block in the video frame. Using the H.264 standard as an example, EA-FRUC encoder 18 may use bits provided by the coded block pattern (CBP) parameter and the motion vector (MV) parameter to indicate the selected FRUC mode. For example, the first FRUC mode may be indicated by setting the CBP parameter and the MV parameter for a block to zero, the second FRUC mode may be indicated by setting the CBP parameter to a nonzero value and the MV parameter to zero, the third FRUC mode may be indicated by setting the CBP parameter to zero and the MV parameter to a nonzero value, and the fourth FRUC mode may be indicated by setting the CBP parameter to a nonzero value and the MV parameter to a nonzero value. Typically, setting the CBP parameter to zero and the MV parameter to zero is an invalid state for purposes of the H.264 standard. However, by slightly breaking or modifying the H.264 standard, the selected FRUC mode can be indicated without increasing the encoding size for the video frame.

In one aspect, decoder 14 may, for example, use the previously described "reference frame" encoding field as a trigger for examining the CBP and MV encoding fields for blocks in the frame. As previously described, the reference frame encoding field indicates that a corresponding reference frame or block in the reference frame was encoded using a FRUC frame interpolated by EA-FRUC encoder 18 when the value stored in the field is N. i.e., one larger than the size of the pre-defined size of the forward reference buffer, i.e., N−1. Thus, by first examining the reference frame encoding field and finding that the forward reference buffer size is N, decoder 14 can determine if a portion of the video frame was encoded using a non-interpolated frame as a reference or the FRUC frame interpolated by EA-FRUC encoder 18 as a reference, and process the information provided by the CBP and MV parameters for the block accordingly.

Decoder 14 receives the transmitted bitstream from encoder 12 and decodes the video frames. In the example of FIG. 1, decoder 14 includes a standard decoder 22 to handle the decoding of I and P frames and an EA-FRUC decoder 24 to handle decoding B frames and interpolation of FRUC frames. Standard decoder 22 applies standard decoding techniques to decode each I frame and P frame, such as $F_1$ and $F_3$, sent by encoder 12. The information encoded in each of frames $F_1$ and $F_3$ permit standard decoder 22 to decode and present a frame of video information. Decoders 22 and 24 need not be separate components, and instead may be integrated as separate processes within a common CODEC, making use of multiple components on a shared basis.

In the illustrated example of FIG. 1, EA-FRUC decoder 24 examines the reference frame encoding field of frame $F_2$, which may reside temporally between $F_1$ and $F_3$, to determine if $F_2$ was encoded using a non-interpolated frame or an interpolated FRUC frame as a reference. When EA-FRUC decoder determines that $F_2$ was encoded using a non-interpolated frame as a reference, EA-FRUC decoder 24 decodes $F_2$ according to standard techniques. For example, EA-FRUC decoder 24 may decode $F_2$ to match the non-interpolated frame specified by the reference frame encoding field. However, when EA-FRUC decoder 24 determines that a portion of $F_2$ was encoded using the FRUC frame interpolated by encoder 12, EA-FRUC decoder examines the CBP and MV parameters for the blocks associated with $F_2$. Based on the CBP and MV parameters, EA-FRUC decoder 24 determines which one of the FRUC modes was used to encode the pertinent blocks of frame $F_2$ and decodes the $F_2$ blocks accordingly.

When a block in frame $F_2$ is encoded using one of the FRUC modes, EA-FRUC decoder 12 interpolates a FRUC frame using the decoded video frames corresponding to reference frames $F_1$ and $F_3$. This FRUC frame matches the FRUC frame interpolated by encoder 12 and is used to decode one or more blocks of $F_2$. For example, when a given block in $F_2$ is encoded using the first FRUC mode, a corresponding block in the FRUC frame interpolated by EA-FRUC decoder 24 can be used as $F_2$ because the FRUC frame and $F_2$ are sufficiently close matches. As another example, when a block in $F_2$ is encoded using the second FRUC mode, EA-FRUC decoder 24 uses the interpolated FRUC frame and the motion vector information provided by the received video frame to decode the respective block in $F_2$. In a further example, when EA-FRUC decoder 24 determines that a block in $F_2$ was encoded using the third FRUC mode, EA-FRUC decoder 24 uses the interpolated FRUC frame and the residual data provided by the received video frame to decode the respective block in $F_2$. In yet another example, when EA-FRUC decoder 24 determines that a block in $F_2$ was encoded using the fourth FRUC mode, EA-FRUC decoder 24 uses the motion vector data and the residual data provided by the received video frame to decode the respective block in $F_2$. In this manner, decoder 14 can efficiently decode the bitstream received from encoder 12.

Figure 2A:
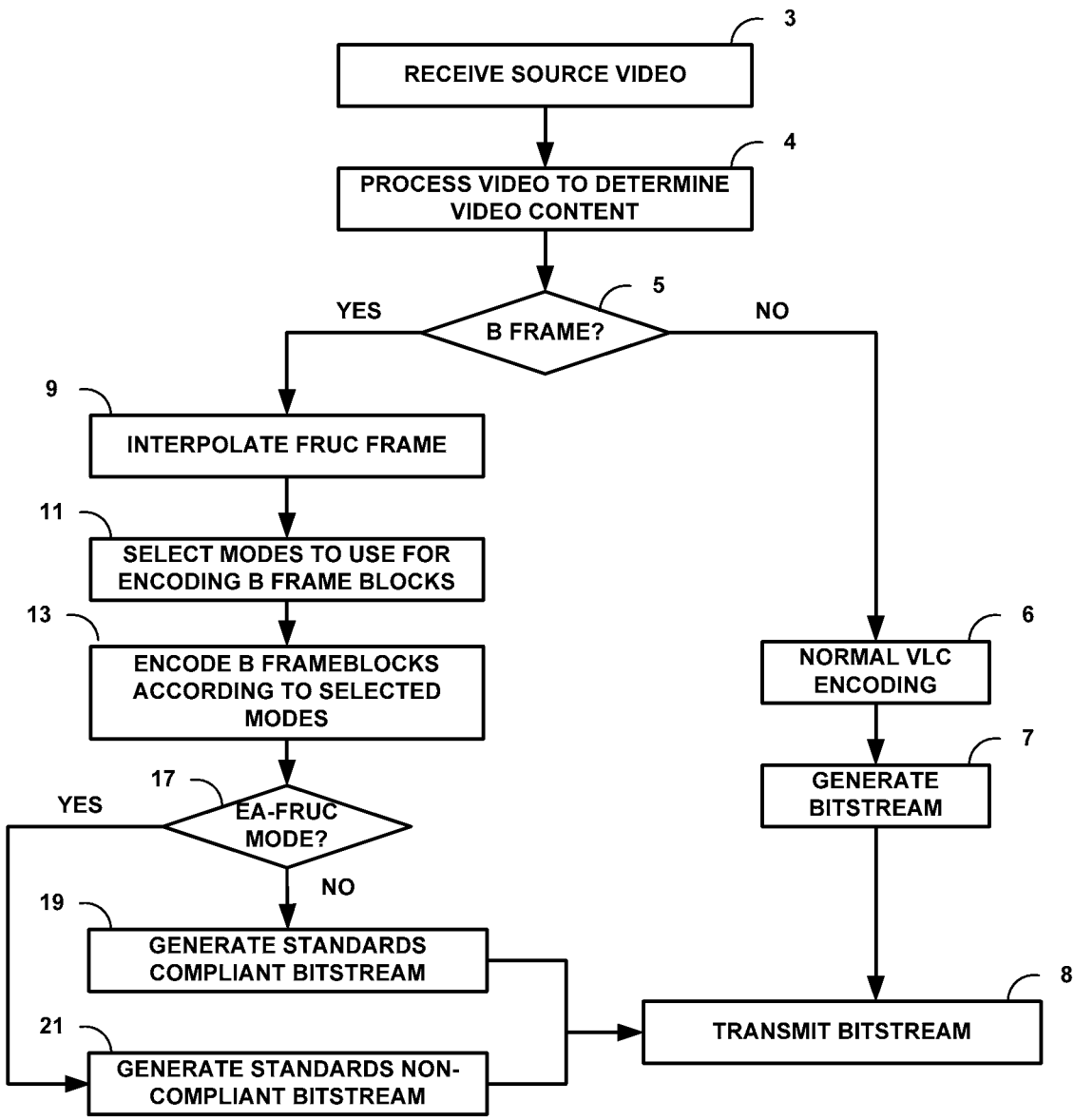
FIGS. 2A and 2B are flow charts illustrating exemplary operation of an encoder and a decoder, respectively, for use in the system of FIG. 1.

FIG. 2A is a flow chart illustrating exemplary operation of encoder 14. As shown in FIG. 2A, encoder 14 receives input source video stream (3). More specifically, with respect to encoder 14, frame processing unit 20 receives an input source video stream 2 and processes video stream 2 to determine the video content (4). Based on the video content, e.g., number of FRUC frames and locations, frame processing module 20 determines if a received video frame is a B frame (5), or if one or more blocks in frame are B blocks.

When frame processing module 20 determines that the received video frame is not a B frame (no branch of 5), frame processing module 20 sends the video frame to standard encoder 16. Standard encoder 16 performs normal variable length coding (VLC) encoding to encode the video frame (6) and generates a bitstream accordingly (7). The bitstream may, for example, be compliant with the ITU-T H.264 standard.

When frame processing module 20 determines that a received video frame is a B frame (yes branch of 5), frame processing module 20 sends the B frame to EA-FRUC encoder 18. EA-FRUC encoder 18 interpolates a FRUC frame at the same time index as the B frame (9) and selects one or more modes for encoding the macroblocks or sub-partitions, i.e., blocks, in the B frame (11). EA-FRUC encoder 18 may select one of a plurality of FRUC modes described in this disclosure for a given block, or may select to apply standard B-mode coding to encode the block instead of choosing an EA FRUC mode.

EA-FRUC encoder 18 encodes each of the blocks in the B frame according to a selected mode (13). If EA-encoder 18 encodes blocks in the B frame according to an EA-FRUC mode (yes branch 17), EA-FRUC encoder 18 generates an H.264 standards non-compliant bitstream (21). The bitstream, in this case, may not comply with the H.264 standard because EA-FRUC encoder 18 may adjust one or more parameters, e.g., the CBP and MV parameters for one or more block, to indicate a selected FRUC mode. In particular, one of the FRUC modes may be indicated by setting bits provided by the modified parameters to a normally invalid state. Additionally, EA-FRUC encoder may also increase the size of the forward reference buffer by one when selecting to encode blocks in the B frame according to one of the FRUC modes. In this case, the size of the reference buffer is greater than the pre-defined max value and, therefore, is non-compliant with the H.264 standard.

On the other hand, when EA-encoder 18 does not encode any of the blocks of the B frame according to one of the FRUC modes (no branch of 17), EA-FRUC encoder 18 generates a bitstream that is compliant with the H.264 standard (19). The bitstream generated by encoder 12 is transmitted to decoder 14 over channel 15 (8).

Figure 2B:
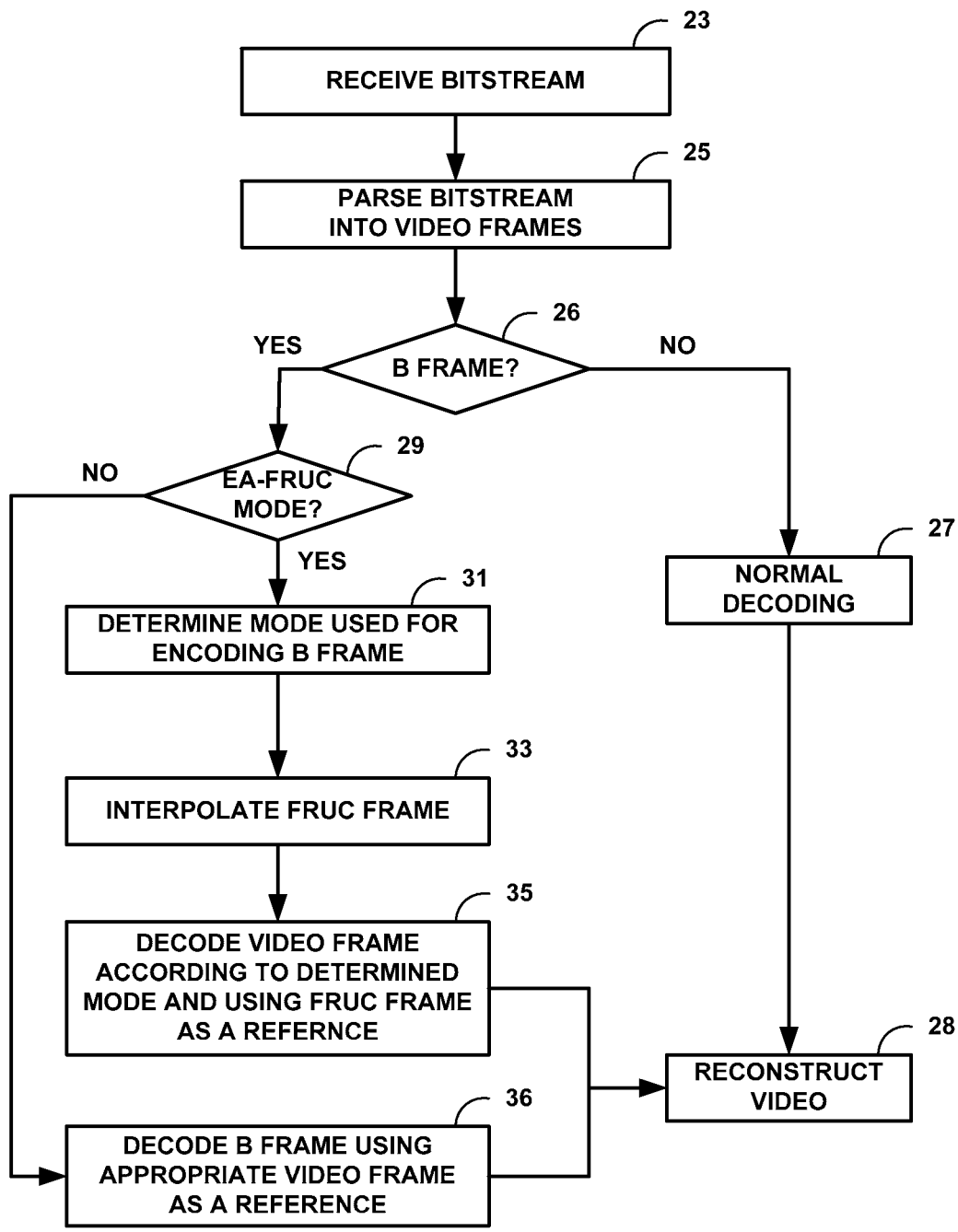

FIG. 2B is a flow chart illustrating exemplary operation of decoder 14. As shown in FIG. 2B, decoder 14 receives a bitstream over channel 15 (23). Upon receiving the bitstream, decoder 14 parses the bitstream into encoded video frames (25) and performs error recovery. Decoder 14 processes each video frame to determine if the video frame is a B frame (26). When decoder 14 determines that the video frame is not a B frame (no branch of 26), standard decoder 22 applies normal decoding operations to the video frame to decode the video frame (27).

However, when decoder 14 determines that the video frame is a B frame (yes branch of 26), EA-FRUC decoder 24 determines if FRUC modes were used to encode any of the blocks in the B frame (29). EA-FRUC decoder 24 may determine that a FRUC mode was used by an indication that the forward reference buffer has increased from N−1 to N, and then may identify the particular FRUC modes that were used to encode the respective blocks in the B frame by examining the pertinent CBP and MV parameters, as previously described.

In order to determine if the B frame was encoded using a non-interpolated frame as a reference or whether any of the B frame blocks were encoded according to one of the FRUC modes using a FRUC frame as a reference (29), EA-FRUC decoder 24 may, for example, process the reference frame encoding field. As previously described, when the value stored in the reference frame encoding field is a value between 0 and N−1, the value indicates which one of the non-interpolated reference frames in the forward reference buffer was used as a reference for encoding the B frame. However, when the value stored in the reference frame encoding field is N, EA-FRUC decoder 24 knows that at least a portion of the B frame was encoded according to one of the FRUC modes using a FRUC frame as a reference.

If blocks in the B frame were encoded according to one of the FRUC modes (29), decoder 24 determines the FRUC mode that was used (31), e.g., by reference to the CBP and MV parameters for the respective block. On this basis, EA-FRUC decoder 24 selects the appropriate FRUC mode for each block. EA-FRUC decoder 24 interpolates a FRUC frame (33) in response to determining that the B frame was encoded according to one of the FRUC modes (yes branch of 29). EA-FRUC decoder 24 can then decode the blocks in the B frame according to the selected FRUC modes (31) using the interpolated FRUC frame (33) as a reference frame (35).

When it is determined that the blocks in the B frame were not encoded according to one of the FRUC modes (no branch of 31), EA-FRUC decoder 24 decodes the B frame using the appropriate video frame as a reference (36). The appropriate reference frame can be determined by examining the reference frame encoding field as previously described. In any case, decoder 14 reconstructs the video frames decoded by standard decoder 22 and EA-FRUC decoder 24 to form a video sequence (28).

Figure 3:
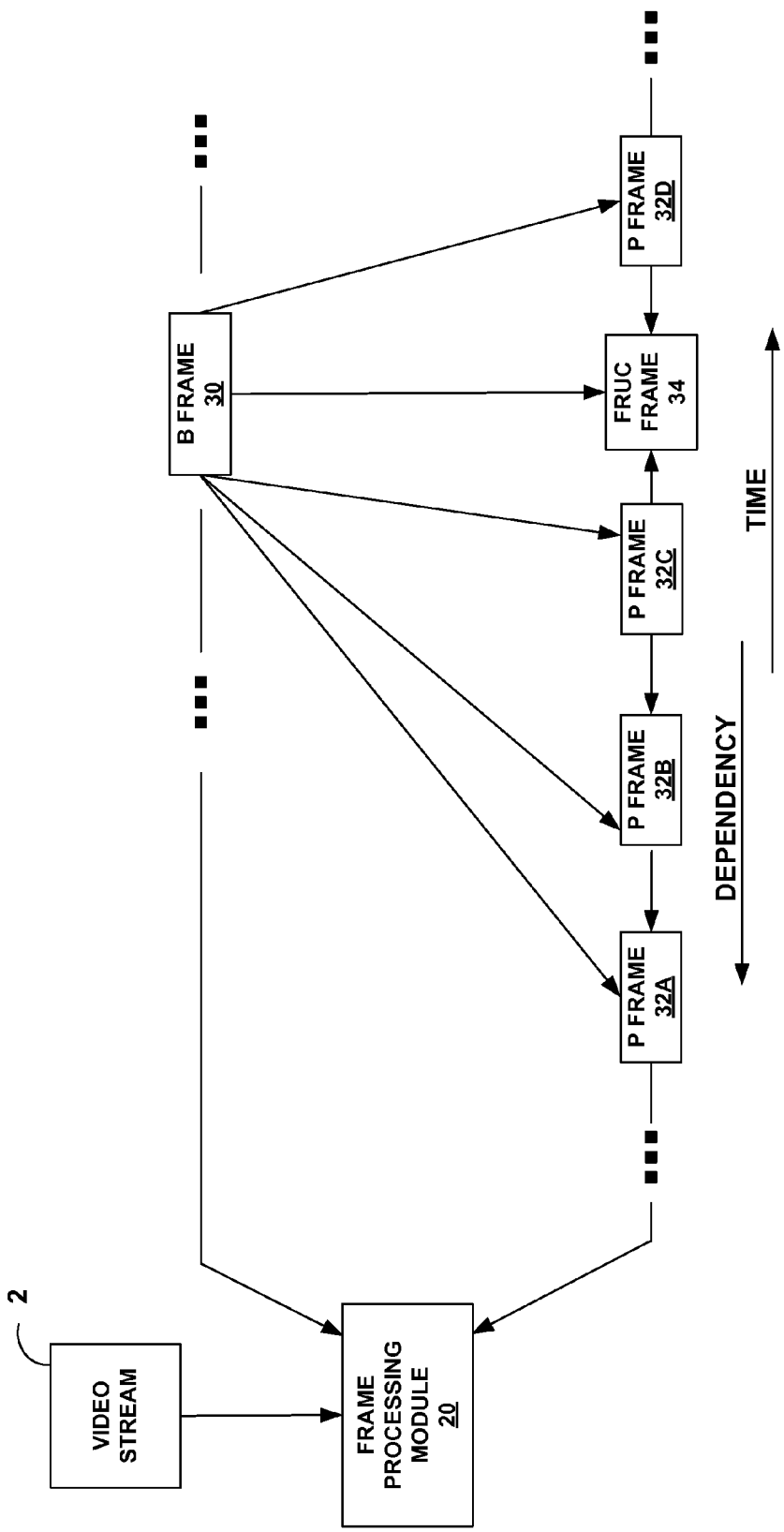
FIG. 3 is a diagram illustrating application of an EA-FRUC technique for use in a video encoder of the system shown in FIG. 1 for a fixed group of pictures (GOP) pattern.

FIG. 3 is a diagram illustrating application of an EA-FRUC technique for use in video encoder 12 for a fixed GOP pattern of P frames and B frames. In the illustrated example of FIG. 3, frame processing module 20 processes input source video stream 2 into P frames 32A-32D, collectively referred to as "P frames 32," FRUC frame 34, and B frame 30. Although only B frame 30 is shown in FIG. 3, the frames produced by frame processing module 20 may include multiple B frames.

FRUC frame 34 is interpolated by encoder 12 at the same time index as B frame 30 and B frame 30 is encoded using FRUC frame 34 as a reference. Thus, the encoding size of B frame 30 is reduced because it includes a differential between FRUC frame 34 and B frame 30. That is, the encoded video frame for B frame 30 includes the residual of "true" B frame 30, as transmitted in video stream 2, and FRUC frame 34. FRUC frame 34 is not encoded or transmitted to decoder 14. Instead, decoder 14 interpolates FRUC frame 34 using the same FRUC technique used by encoder 12. Consequently, FIG. 3 merely illustrates the dependent relationships for B frame 30.

In this configuration, the probability of dropping B frame 30 across channel 15 may be decreased because of the reduced encoding size for B frame 30. In the case that the B frame 30 is dropped, for example, under degrading transmission conditions, decoder 14 can still perform FRUC to replace the missing B frame 30 with FRUC frame 34. Although visual quality may suffer to some degree, decoder 14 may still able to produce a reasonable facsimile of the B frame 30 using the FRUC process.

As shown in FIG. 3, B frame 30 may be encoded with reference to any of P frames 32 and FRUC frame 34, or a combination of such frames. Accordingly, the forward reference buffer for B frame 30 includes P frames 32A-32C and FRUC frame 30 and the backward reference buffer for B frame 30 includes P frame 32D. To determine which of one of the possible reference frames to use as a reference for encoding B frame, encoder 12 performs motion estimation for each of the reference frames included in the forward and backward reference buffers, i.e., P frames 32 and FRUC frame 34. More specifically, encoder 12 may encode different portions of B frame 30, e.g., different blocks such as macroblocks, subpartitions or subblocks, using different reference frames. B frame may be divided into an number of blocks, such as macroblocks (MBs) and other smaller subblocks, such as a 16×16 array of pixels, or into any number of smaller subblocks such as 8×8 subblocks or 4×4 subblocks, each of which may be coded independently or differently relative to other blocks. In particular, such blocks within a B frame may be encoded using different EA-FRUC modes depending on applicable rate-distortion (RD) optimization decisions, as described in this disclosure.

In general, subblocks may vary across B frame 30, P frames 32, and FRUC frame 34. For example, motion estimation algorithms may used to encode B frame 30 as a frame or a plurality of blocks. As an example, B frame 30 may be encoded in terms of blocks that include sizes such as 16×16, 16×8, 8×16, 8×8, 8×4, 4×8, and 4×4 pixels, although other blocks sizes are conceivable. Thus, B frame 30 may be partitioned into a set of encoded blocks that encode substantially all the pixels of the frame. The encoded blocks may be of different sizes and each of the encoded blocks may be encoded using a different EA-FRUC mode as described in this disclosure. Accordingly, a FRUC frame 34 may be used as a reference frame for some or all of the blocks of a B frame 30 to be encoded.

In order to select which frame to use as a reference for encoding B frame 30, encoder 12 performs motion estimation for B frame 30, or each subblock of B frame 30. With respect to performing motion estimation using FRUC frame 34, encoder 12 performs motion estimation for each of the different FRUC modes. The motion estimation algorithm calculates motion compensation information, e.g., motion vectors and residual data, for each group of blocks. For example, encoder 12 may first calculate motion compensation information data for larger blocks, such as 16×16 blocks, followed by each subblock or subpartition of the larger blocks, e.g., 16×8 blocks, 8×16, 8×8, 4×8, 4×4 blocks, and the like.

As previously described, encoder 12 selects the reference frame and, in the case of FRUC frame 34, the FRUC mode for encoding B frame 30 based on a RD optimization decision. When encoder 12 selects one of the FRUC modes for encoding each block in B frame 30, encoder 12 adjusts the CBP and MV vector parameters for the respective block accordingly to communicate to decoder 14 the FRUC mode that was used by encoder 12.

Figure 4:
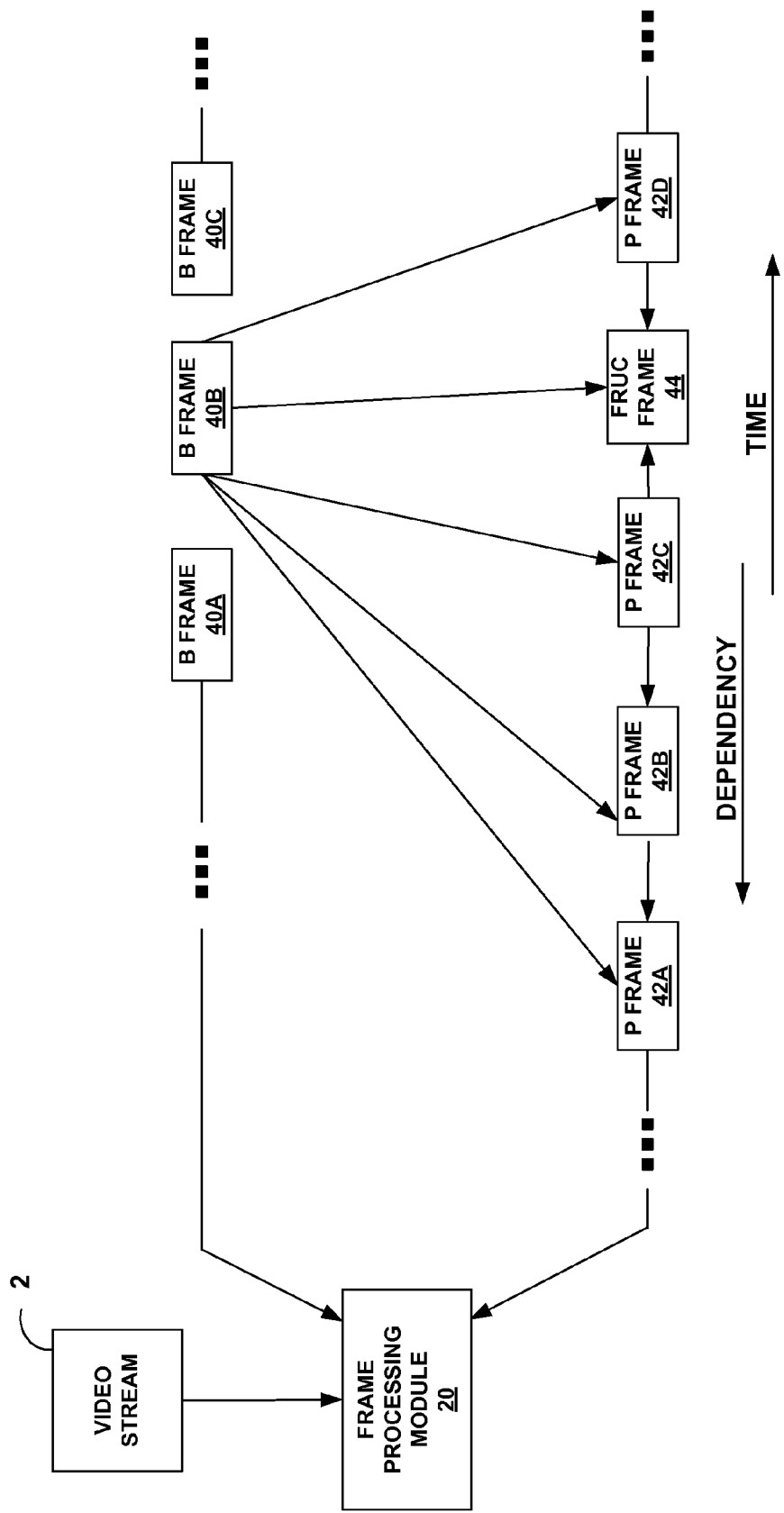
FIG. 4 is a diagram illustrating application of another EA-FRUC technique for use in a video encoder of the system shown in FIG. 1 for an adaptive GOP pattern.

FIG. 4 is a diagram illustrating application of an EA-FRUC technique for use in video encoder 12 for an adaptive GOP pattern. In an adaptive GOP pattern, multiple B frames may be encoded between neighboring P frames based on the video content and an independent FRUC frame may be generated at the same time index for each B frame.

As shown in FIG. 4, frame processing module 20 processes input source video stream to generate B frames 40A-40C and P frames 42A-42D. B frames 40A-40C are encoded between P frames 44C and 44D. The arrows between B frame 40B and P frames 44C-44D illustrate the possible dependent relationships for B frame 40B. Accordingly, the forward reference buffer for B frame 40B includes P frames 42A-42C and FRUC frame 44 and the backward reference buffer includes P frame 42D. Although not illustrated in FIG. 4 with arrows, B frame 40A and B frame 40C may also be referenced to P frames 44A-44C. Additionally, although not shown, encoder 12 may interpolate a corresponding FRUC frame for each of B frames 40A and 40C. The forward reference buffer for each of B frames 40A-40C includes P frames 42A-42C and the corresponding FRUC frame. In other words, the forward reference buffer for B frame 40A includes the corresponding FRUC frame (not shown) and P frames 42A-42C, but not FRUC frame 44 because FRUC frame 44 corresponds to B frame 40B.

Selecting which FRUC mode to use for encoding a block within B frame 40B follows the same technique as described in FIG. 3 except that FRUC frame 44 may be generated differently. In particular, the information of P frames 42C and 42D may be scaled based on the number of other B frames, e.g., B frames 40A and 40B, between P frames 42C and 42D. Otherwise, the process of performing motion estimation and selecting the FRUC mode based on a RD optimization decision remains the same. This process is the same for B frames 40A and 40C as well, except that the corresponding FRUC frame, rather than FRUC frame 44, is used.

Figure 5:
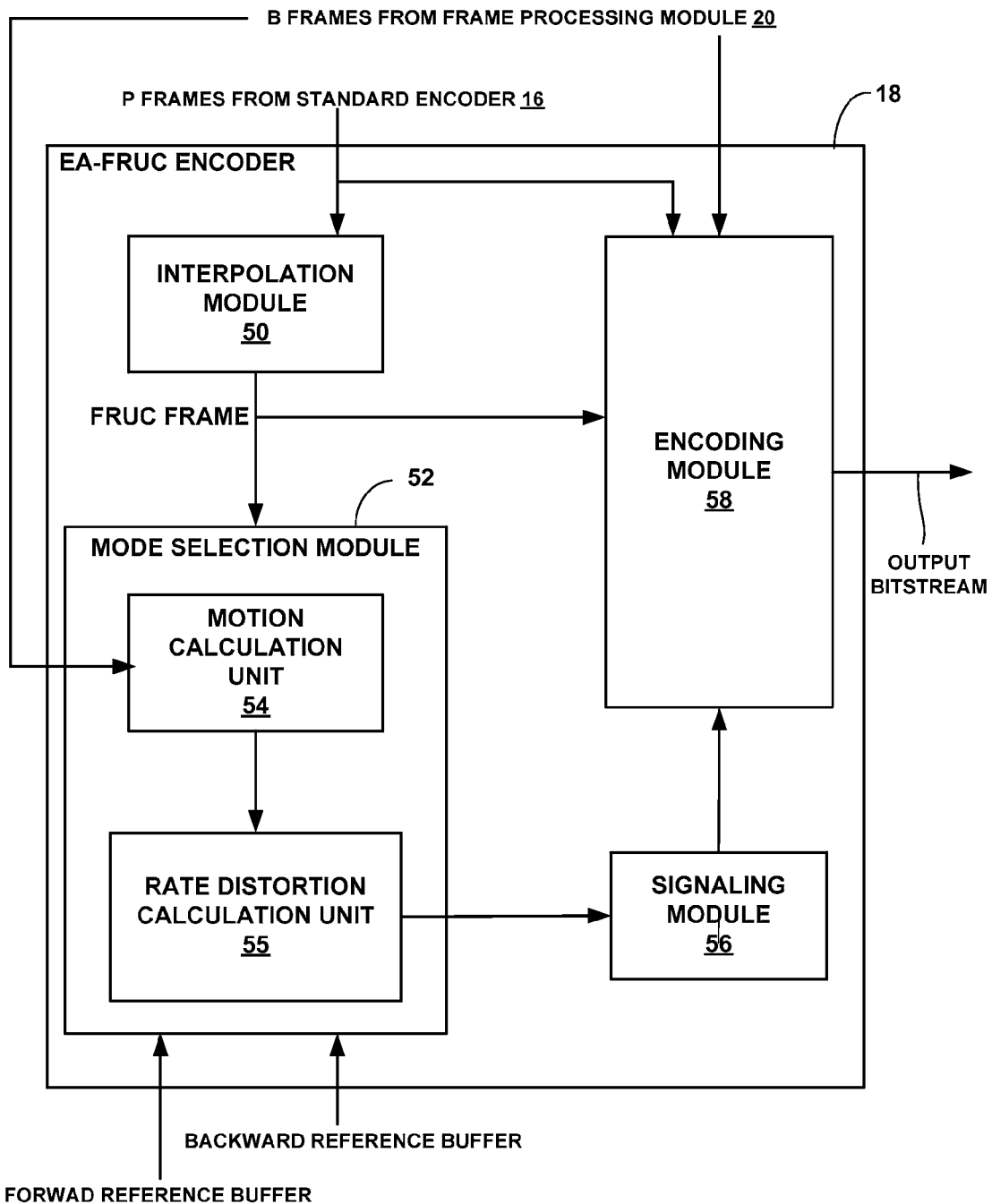
FIG. 5 is a block diagram illustrating an EA-FRUC encoder for use in a video encoder as shown in FIG. 1.

FIG. 5 is a block diagram illustrating an example of EA-FRUC encoder 18 in greater detail. As shown in FIG. 5, EA-FRUC encoder 18 includes interpolation module 50, mode selection module 52, signaling module 56, and encoding module 58. Mode selection module 52 further includes motion calculation unit 54 and rate distortion (RD) calculation unit 55. In general, EA-FRUC encoder 16 selectively encodes blocks in B frames received from standard encoder 16 according to one of a plurality of FRUC modes.

Interpolation module 50 interpolates a FRUC frame at the same time instance as a B frame, such as $F_2$, using P frames received from standard encoder 16. In particular, interpolation module 50 interpolates a FRUC frame at the same time index as the B frame and generates the FRUC frame in the same manner as decoder 14 generates a FRUC frame for the B frame. Using frame $F_2$ as an example, interpolation module 50 interpolates a FRUC frame using frames $F_1$ and $F_3$.

In general, mode selection module 52 selects one of the plurality of FRUC modes for encoding each block in $F_2$. Mode selection module 52 may, for example, select the FRUC mode based on an RD optimization decision that uses the results of motion estimation to balance the requirements of coding bitrate and visual quality loss. In particular, motion calculation unit 54 performs motion estimation for $F_2$ with respect to each of the possible reference frames. The possible reference frames include the FRUC frame generated by interpolation module 50 and the non-interpolated video frames included in the forward and backward reference buffers for the B frame, i.e., $F_1$, $F_3$, and the FRUC frame generated at the same time instance as $F_2$ with respect to $F_2$.

Motion calculation unit 54 generates motion vectors representing motion between video blocks within $F_2$ and corresponding blocks within the preceding frame $F_1$, subsequent frame $F_3$, and FRUC frame generated at the same time instance as frame $F_2$. Motion calculation unit 54 also generates residual data representing the difference between video blocks within $F_2$ and corresponding blocks within $F_1$, $F_2$, and the FRUC frame.

RD calculation unit 55 may evaluate the results of using each of the FRUC modes for encoding blocks in frame $F_2$. RD calculation unit 55 also may evaluate the results of using $F_1$ or $F_3$ for encoding blocks in frame $F_2$. In particular, RD calculation unit 55 may selectively apply the information generated by motion estimation unit 54 to an RD function for each of the FRUC modes. For example, RD calculation unit 55 process the RD cost function for a block using no motion vector data and no residual data for the first FRUC mode. In another example, RD calculation unit 55 processes the RD cost function using only motion vector data for the second FRUC mode. In an additional example, RD calculation unit 55 processes the RD cost function using only residual data for the third FRUC mode. In yet another example, RD calculation unit 55 applies residual data and motion vector data to the RD cost function for the fourth FRUC mode.

RD calculation unit 55 compares the results of the cost function for each of the FRUC modes as well as for $F_1$ and $F_3$, and selects the FRUC mode that minimizes the RD cost function for the encoded block. More specifically, RD calculation unit 55 outputs a signal that is indicative of the selected FRUC mode for the block. In this manner, encoding module 56 determines applicable FRUC modes for the blocks within the frame.

Signaling module 56 receives the output and adjusts one or more parameters accordingly. As previously described, signaling module 56 may, for example, set the bits provided by the CBP parameter and the MV parameter for a block to either a zero or nonzero value to indicate the selected FRUC mode. Signaling module 56 may also set the reference frame encoding field to a value one greater than the pre-defined size of the forward reference buffer, i.e., set the field to N instead of N−1, when one of the FRUC modes is selected. In this manner, decoder 14 can examine the reference frame encoding field to determine if the corresponding video frame was encoded using a FRUC frame or a non-interpolated video frame as a reference.

When this encoding field indicates that at least a portion of the video frame was encoded using a FRUC frame as a reference, decoder 14 can process the CBP and MV parameters for each block accordingly. That is, decoder 14 knows to process the CBP and MV parameters to determine which FRUC mode was selected for a block instead of processing the CBP and MV parameters in a normal manner. This should be noted because the first FRUC mode may be indicated by an invalid state as defined by the H.264 standard and decoder 14 may interpret this as an error if the reference frame encoding field is not examined prior to the CBP and MV parameters.

Accordingly, encoding module 58 generates a proprietary output bitstream when one of the FRUC modes is selected for encoding a block in $F_2$. Otherwise, encoding module 58 generates a standard output bitstream. That is encoding module 58 generates the output stream in accordance with the H.264 standard syntax when $F_2$ is encoded using $F_1$ or $F_3$ as a reference.

Figure 6:
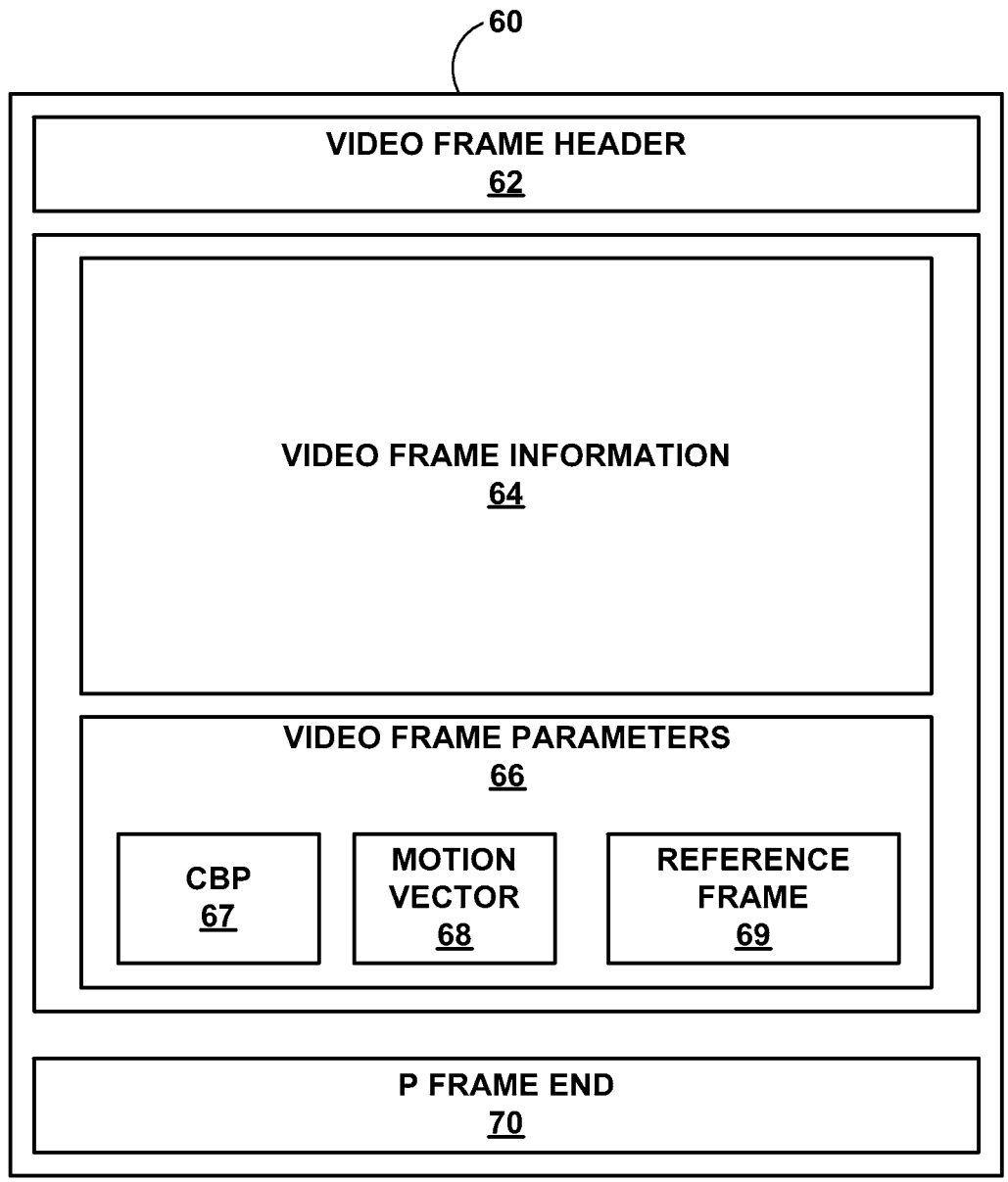
FIG. 6 illustrating a video frame encoded according to the EA-FRUC techniques described in this disclosure.

FIG. 6 is a block diagram illustrating a video frame 60 encoded according to one of the FRUC modes described in this disclosure. Video frame includes a video frame header 62, video frame information 64 including encoded video content, video frame parameters 66, and a video frame end 70. In the illustrated example of FIG. 6, the amount of video information 64, i.e., motion vector data and residual data, is reduced by encoding blocks in video frame 60 using a FRUC frame interpolated at the same time index as video frame 60. Video information 64 may be further reduced based on the FRUC mode selected for encoding the blocks within video frame 60.

As previously described, video information 64 for a given block in video frame 60 may not include any motion compensation information when the block is encoded using the first FRUC mode. Alternatively, video information 64 for a given block may include only motion vector information when the block is encoded using the second FRUC mode. As another example, video information 64 for a given block may only include residual data when the block is encoded using the third FRUC mode. As yet another example, video information 64 for a given block in video frame 60 may include motion vector data and residual data when the block is encoded using the fourth FRUC mode. However, video information 64 may be reduced in each of these cases relative to the video information required when encoding a video frame using a non-interpolated frame as a reference.

In the illustrated example of FIG. 6, video frame parameters 66 include a CBP parameter 67, a motion vector parameter 68, and a reference frame parameter 69. The CBP parameter 67 and motion vector parameter 68 may be specified independently for individual blocks within the frame 60. Each of parameters 67-69 may be an existing parameter that is defined in the syntax of an applicable standard such as the H.264 standard and is included in an encoded video frame. The techniques described in this disclosure may be especially applicable to the H.264 standard, but need not be limited as such. By using video frame parameters 66 to indicate which FRUC mode was used for encoding a block within video frame 60, sufficient coding information can be provided in an efficient manner.

In particular, CBP parameter 67 and motion vector parameter 68 are used for indicating the FRUC mode used to encode a block within video frame 60. As previously described, each of CBP parameters 67 and 68 may provide a bit that can be set to a zero and a nonzero value. Accordingly, CBP parameter 67 and motion vector parameter 68 can be used to indicate the FRUC modes described in this disclosure. Hence, different blocks in frame 60 may have different CBP and motion vector (MV) parameters to indicate different FRUC modes for the respective blocks.

Reference frame 69 corresponds to the reference frame encoding field referred to previously in this disclosure. Accordingly, reference frame parameter 69 is used to indicate if blocks in video frame 60 are encoded using an interpolated FRUC frame as a reference or a non-interpolated video frame as a reference. For example, decoder 14 may identify a block in reference frame 60 as being encoded based on one of the non-interpolated reference frames included in a forward reference buffer when reference parameter 69 is numbered from 0 to N−1. However, decoder 14 may identify a block in reference frame 60 as being encoded according to one of the described FRUC modes when reference parameter 69 is set to N. When reference frame parameter 69 is set to N, decoder 14 interprets CBP parameter 67 and motion vector parameter 68 to determine which of the FRUC modes was used for encoding a given block in video frame 60.

Figure 7:
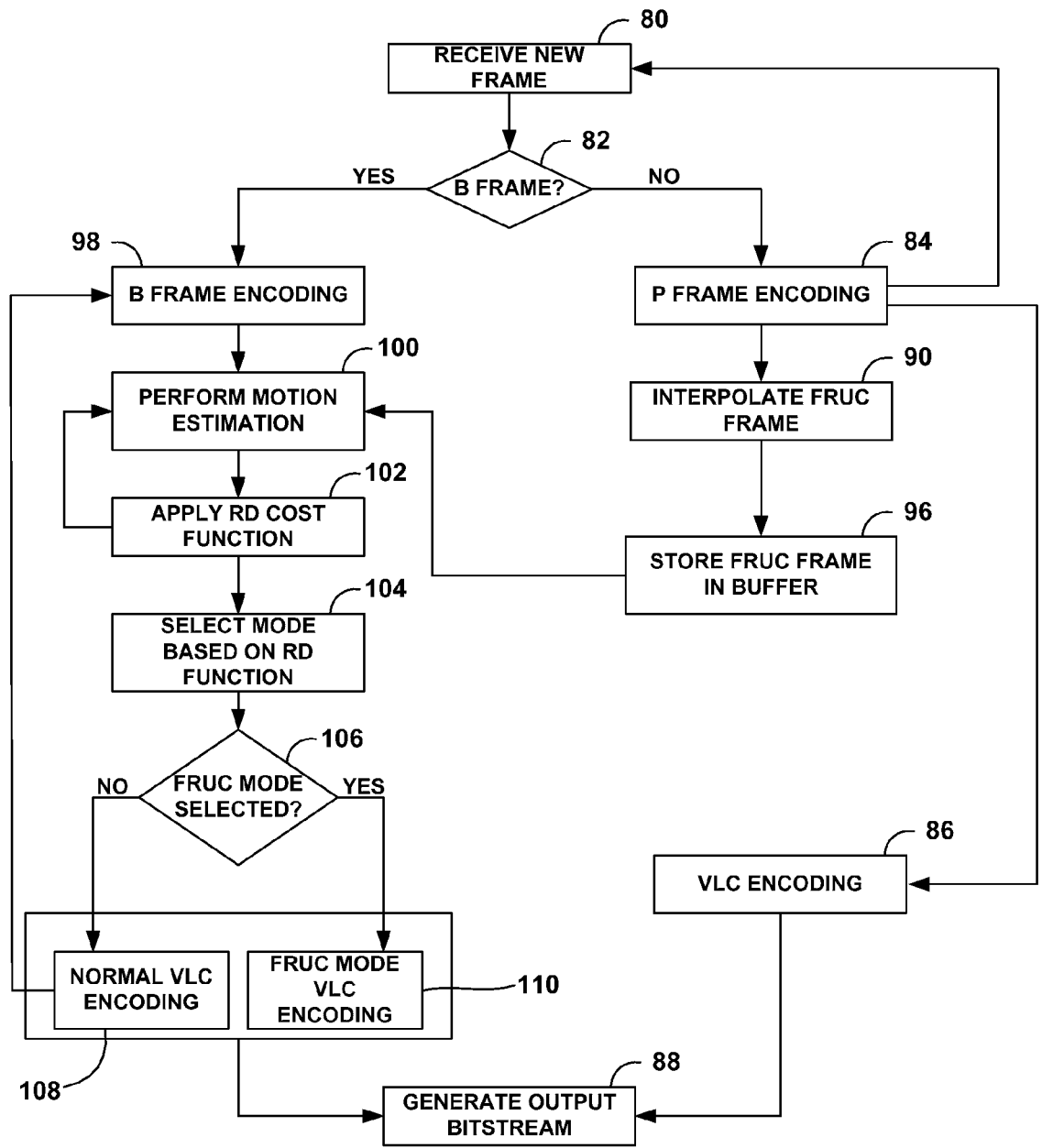
FIG. 7 is a flow chart illustrating a technique for encoding video frames or portions thereof in accordance with an adaptive EA-FRUC technique described in this disclosure.

FIG. 7 is a flow chart illustrating a technique for adaptive EA-FRUC. In general, the technique illustrated in FIG. 7 may be performed by encoder 12 to selectively encode blocks in a video frame, such as a B frame or P frame, according to one of a plurality of FRUC modes. The FRUC mode is selected to balance the requirements of coding bitrate and visual quality loss and reduces the encoding size of the video frame because the video frame is encoded using a FRUC frame as a reference. The selected FRUC mode can be identified efficiently and, in some aspects, without increasing the encoding size, by adjusting existing parameters or encoding fields associated with blocks in the frame. Decoder 14 can efficiently decode the encoded video frame by examining the modified parameters to determine which FRUC mode to use for decoding blocks in the video frame.

The process shown in the flow chart of FIG. 7 begins when encoder 12 receives a video frame 80. Encoder 12 may receive video frames in a fixed GOP pattern, such as IBPB-PBP, or an adaptive GOP pattern in which multiple B frames can be encoded between neighboring P based on the video content. Encoder 12 processes the received video frame to determine if the video frame is a B frame 82. If the video frame is not a B frame, encoder 12 performs P frame encoding 84, e.g., encodes the blocks in the P frame using the preceding P frame as a reference. Encoder 12 then performs variable length coding (VLC) 86 on the encoded P frame and generates an output bitstream 88 that is transmitted over channel 15 to decoder 14.

After encoder 12 encodes the P frame, encoder 12 interpolates a FRUC frame 90. In particular, encoder 12 interpolates the FRUC frame at the same time index as the subsequent B frame. Encoder 12 may interpolate the FRUC frame by generating FRUC information using information of the just encoded P frame, i.e., the P frame encoded in step 90, when the subsequent B frame is the first of multiple frames in-between neighboring P frames. Otherwise, encoder 12 may generate FRUC information by scaling the FRUC information of both neighboring P frames and using the scaled FRUC information to generate the FRUC frame. Encoder 12 may interpolate the FRUC frame in this manner when a single B frame is encoded between neighboring P frames.

In order to interpolate the FRUC frame, the motion vectors for the P frame may be stored in a motion vector buffer and the P frame may be reconstructed and stored in a reconstructed frame buffer. Encoder 12 interpolates a FRUC frame 90 using the information stored in the motion vector buffer and the reconstructed frame buffer. Encoder 12 stores the FRUC frame in a buffer 96. When the FRUC frame is stored in the buffer, encoder 12 may adjust the reference frame encoding field. That is, the size of the forward reference buffer is increased to N when the FRUC frame is stored in the buffer to indicate that the FRUC frame is used as a reference frame.

After encoding the P frame in step 84, encoder 12 receives another video frame and processes this video frame to determine if it is a B frame 82. When encoder 12 determines that the received video frame is a B frame, encoder performs B frame encoding for the video frame 98. In order to reduce the encoding size of the B frame, encoder 12 performs motion estimation 100 for the B frame for each possible reference frame. The possible reference frames are stored in the forward and backward reference buffers. As previously described, the FRUC frame generated in step 90 is stored in the forward reference buffer.

Encoder 12 applies a RD cost function to the motion estimation results 102 and selects a FRUC mode or normal mode for each block in the frame based on the RD cost function 104. With respect to the motion estimation results generated using the FRUC frame as a reference for the B frame, encoder 12 applies the RD cost function for each of the FRUC modes. In other words, as previously described, encoder 12 may apply the RD cost function to the information of the motion estimation result that corresponds with each FRUC mode. Using the second FRUC mode as an example, encoder 12 may apply only the motion vector information resulting from the motion estimation to the RD cost function. In this manner, encoder 12 can compare the results of the RD cost function for each block in a non-interpolated reference frame and each FRUC mode for the FRUC frame to determine which mode to select 106. Encoder 12 may then selects the FRUC mode or normal, non-FRUC mode that minimizes the RD cost function for a given block or, if not minimal, at least produces the most desirable RD cost.

If one of the FRUC modes minimizes the RD cost function for a given block, encoder 12 performs VLC encoding of that block according to the selected FRUC mode 110. Otherwise, encoder 12 performs normal VLC encoding 108 of the block using the selected non-interpolated video frame as a reference. Encoder 12 generates an output bitstream 88 that is transmitted to decoder 14. The output bitstream may be compliant with the H.264 standard when encoder 12 encodes the B frame using normal VLC encoding. However, when encoder 12 encodes one or more blocks in the B frame using one of the described FRUC modes, the output bitstream may not be compliant with the H.264 standard because of the adjustments made to one or more parameters of the encoded B frame, such as the CBP and MV parameters.

In particular, the output bitstream may not be compliant because the reference frame encoding field is increased from N−1 to N when the B frame is encoded according to one of the FRUC modes and the CBP and MV parameters for one or more blocks are used to indicate the selected FRUC mode. Although the output bitstream is not compliant, decoder 14 can efficiently decode the bitstream.

Figure 8:
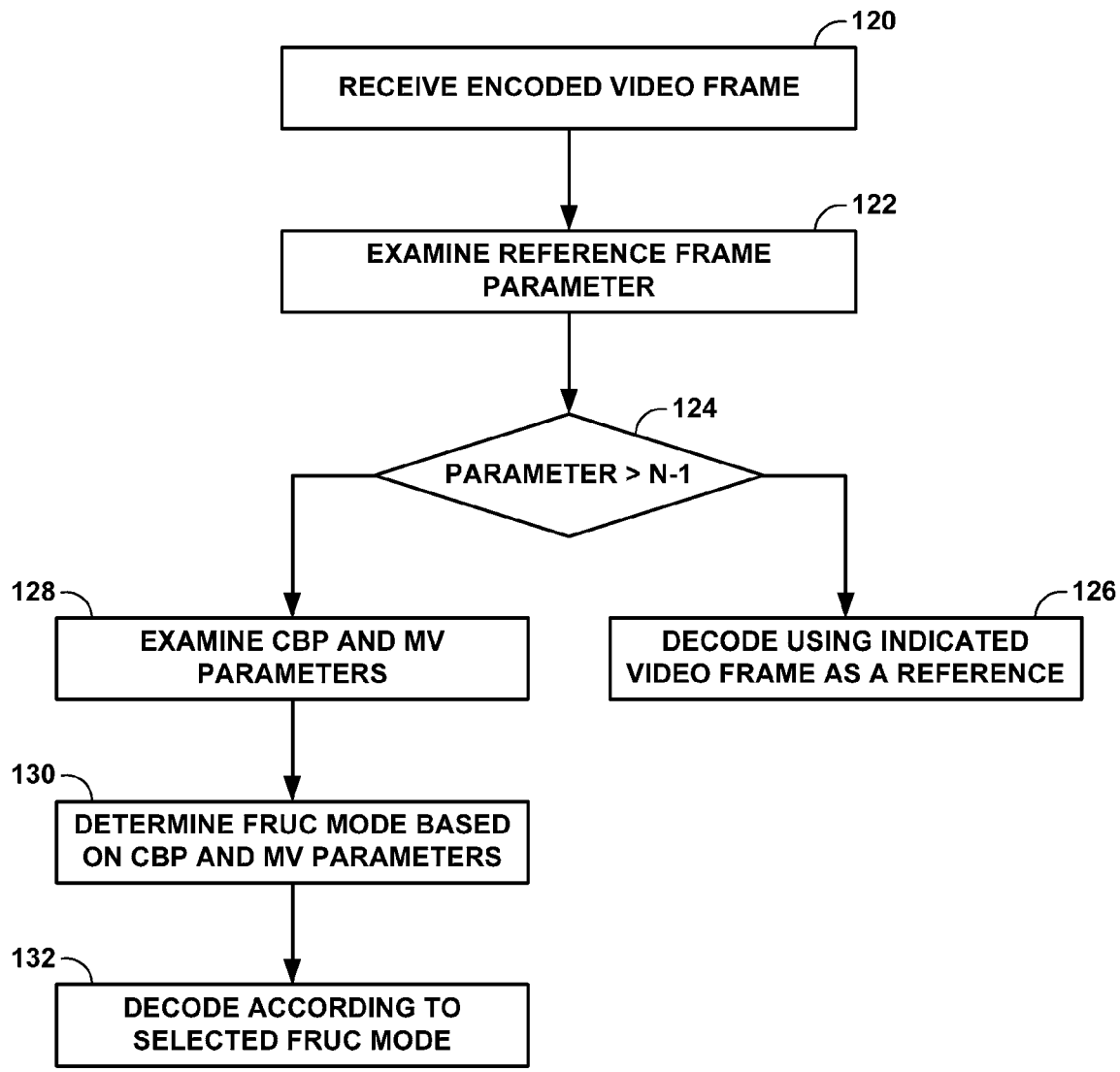
FIG. 8 is a flow chart illustrating a decoding technique for video frames or portions thereof encoded according an adaptive EA-FRUC technique described in this disclosure.

FIG. 8 is a flow chart illustrating a decoding technique for decoding video frames encoded according to the adaptive EA-FRUC techniques described in this disclosure. In general, the decoding technique shown in FIG. 8 is performed by decoder 14 to efficiently decode encoded video frames received from encoder 14. The flow chart begins when decoder 14 receives an encoded video frame 120.

Upon receiving the encoded video frame 120, decoder 14 examines the reference frame parameter or encoding field 122 to determine if the video frame was encoded according to one of the described FRUC modes or encoded using a non-interpolated video frame as a reference. If the reference frame parameter is greater than N−1 124, where N is the number of non-interpolated reference frames in the forward reference buffer, decoder 14 proceeds to decode blocks in the video frame according to one of the described FRUC modes. However, if the reference frame parameter is less than N−1, decoder 14 decodes blocks in the video frame using the indicated video frame as a reference 126. When the reference frame parameter stores a value between 0 and N−1, the value identifies the non-interpolated reference frame used as a reference for encoding the video frame.

However, when the reference frame parameter stores a value of N, decoder 14 examines the CBP and MV parameters for each block of the video frame 128 and determines the FRUC mode used for encoding the respective block based on the CBP and MV parameters 130. In this manner, the reference frame parameter is used as a trigger by decoder 14 to determine when the CBP and MV parameters are used normally, i.e., in compliance with the H.264 standard, or to indicate the FRUC mode used for encoding a block in the video frame. After determining the FRUC mode, decoder 14 can decode the video frame according to the selected FRUC mode, i.e., the FRUC mode determine in step 130.

Figure 9:
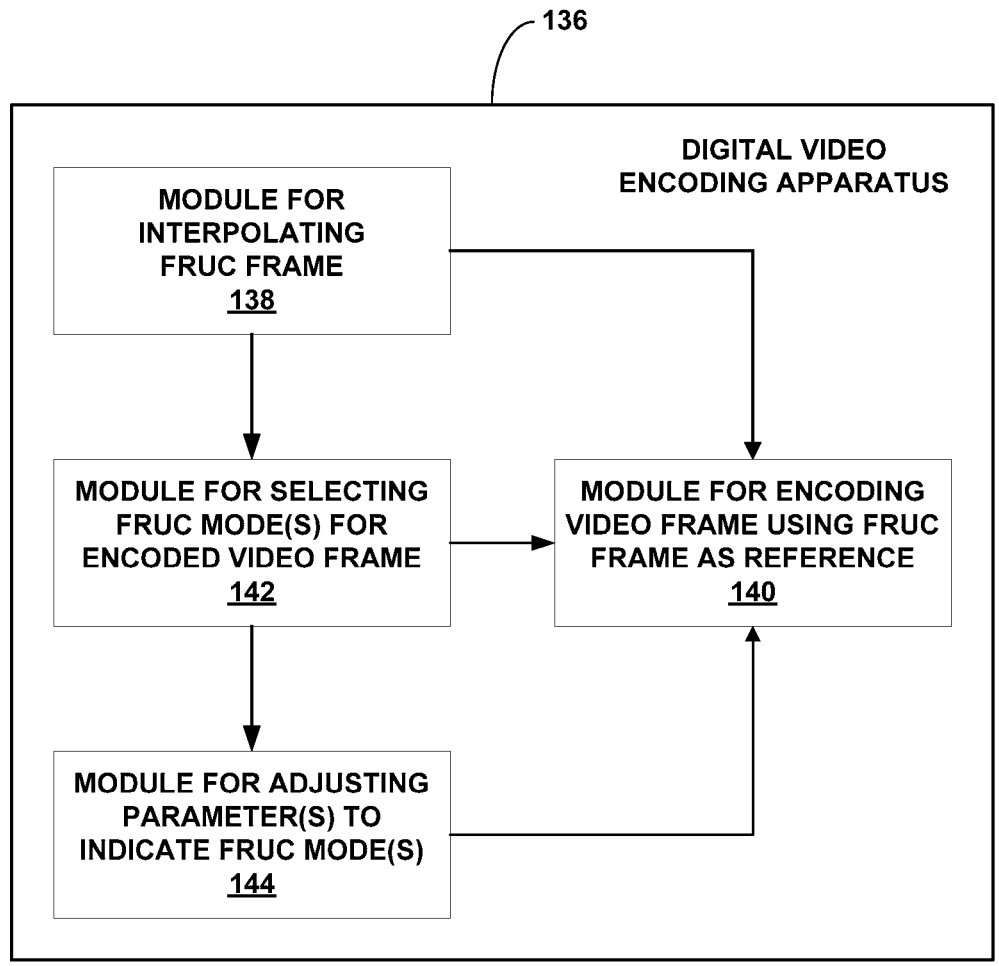
FIG. 9 is a block diagram illustrating an apparatus for encoding video frames or portions thereof in accordance with an adaptive EA-FRUC technique described in this disclosure.

FIG. 9 is a block diagram illustrating a digital video encoding apparatus 136 for encoding video frames or portions thereof in accordance with an adaptive EA-FRUC technique described in this disclosure. Digital video encoding apparatus 136 may reside in a video encoder, such as video encoder 12 of FIG. 1, and may be realized by hardware, software, or firmware, or any suitable combination thereof. As shown in FIG. 9, digital video encoding apparatus 136 may include a module 138 for interpolating a FRUC frame as described herein, a module 140 for encoding a video frame using the FRUC frame as a reference as described herein, a module 142 for selecting one or more FRUC modes for encoding a video frame or portion thereof as described herein, and a module 144 for adjusting parameters to indicate the FRUC modes used to encode the video frame or portions thereof as described herein. In some example configurations, module 138 may correspond substantially to interpolation module 50 of FIG. 5, module 140 may correspond substantially to encoding module 58 of FIG. 5, module 142 may correspond substantially to mode selection module 52 of FIG. 5, and module 144 may correspond substantially to signaling module 56 of FIG. 5.

Figure 10:
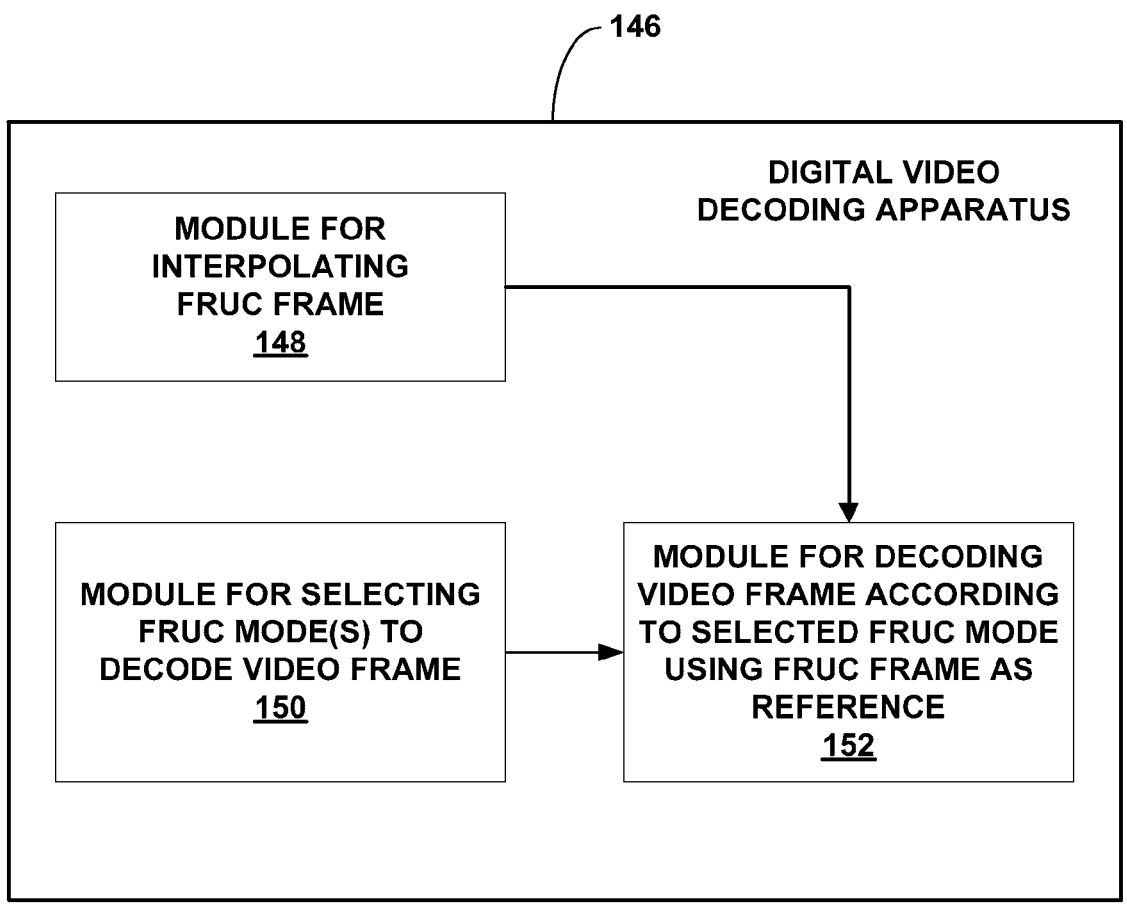
FIG. 10 is a block diagram illustrating an apparatus for decoding video frames or portions thereof encoded according an adaptive EA-FRUC technique described in this disclosure.

FIG. 10 is a block diagram illustrating a digital video decoding apparatus 146 for decoding video frames or portions thereof encoded according an adaptive EA-FRUC technique described in this disclosure. Digital video decoding apparatus 146 may reside in a video decoder, such as video decoder 14 of FIG. 1, and may be realized by hardware, software, or firmware, or any suitable combination thereof. As shown in FIG. 10, digital video decoding apparatus 146 may include a module 148 for interpolating a FRUC frame as described herein. Digital video decoding apparatus 146 also may include a module 150 for selecting one or more FRUC modes to decode at least a portion of a digital video frame as described herein, e.g., based on one or more parameters for the at least a portion of the encoded video frame that indicate the selected FRUC mode. In addition, digital video decoding apparatus 146 may include a module 152 for decoding a video frame or portion thereof according to the selected FRUC mode using the FRUC frame as a reference.

The techniques described herein may be implemented in hardware, software, firmware, or any combination thereof. If implemented in software, the techniques may be realized in part by a computer program product for digital video encoding comprising a computer-readable medium, wherein the computer-readable medium comprises codes for causing a computer to execute techniques in accordance with this disclosure. In this case, the computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. In some aspects, the functionality described herein may be provided within dedicated software modules or hardware modules configured for encoding and decoding, or incorporated in a combined video encoder-decoder (CODEC).

Various modifications may be made to the techniques described without departing from the scope of the following claims. Accordingly, the specific aspects described above, and other aspects are within the scope of the following claims.

The invention claimed is:

1. A digital video encoding method comprising:
interpolating, using a processor, a frame rate up-conversion (FRUC) video frame;
selecting one of a plurality of FRUC modes for encoding at least a portion of an encoded video frame, wherein each FRUC mode of the plurality of FRUC modes is associated with encoding different types of motion compensation information;
encoding, using the processor, the at least a portion of the video frame based on the selected FRUC mode and using the FRUC frame as a reference;
adjusting, using the processor, one or more parameters for the at least a portion of the encoded video frame to indicate the selected FRUC mode; and
generating a bitstream that includes the encoded video frame, wherein the bitstream does not include the FRUC frame.

2. The method of claim 1, wherein selecting one of a plurality of FRUC modes comprises selecting one of a plurality of FRUC modes for at least one of a plurality of blocks within the encoded video frame, and adjusting one or more parameters comprises adjusting one or more parameters associated with at least one of the blocks to indicate the selected FRUC mode for the respective blocks.

3. The method of claim 2, wherein adjusting one or more parameters comprises adjusting a coded block pattern (CBP) parameter and a motion vector (MV) parameter for each of the blocks to indicate the selected FRUC mode.

4. The method of claim 3, further comprising setting the CBP parameter to zero and the MV parameter to zero to indicate a first FRUC mode, setting the CBP parameter to zero and the MV parameter to a nonzero value to indicate a second FRUC mode, setting the CBP parameter to a nonzero value and the MV parameter to zero to indicate a third FRUC mode, and setting the CBP parameter to a nonzero value and the MV parameter to a nonzero value to indicate a fourth FRUC mode.

5. The method of claim 1, wherein selecting one of a plurality of FRUC modes comprises selecting one of the FRUC modes based on a rate distortion optimization decision.

6. The method of claim 1, further comprising including mode information representing the different types of motion compensation information in the encoded video frame, wherein the mode information comprises no residual information and no motion vector information for a first FRUC mode, motion vector information for a second FRUC mode, residual information for a third FRUC mode, and both residual information and motion vector information for a fourth FRUC mode.

7. The method of claim 1, wherein the interpolating a FRUC video frame is performed from frames in the same view previous and subsequent to the yet to be encoded video frame.

8. The method of claim 1, wherein the FRUC video frame is interpolated to include content of a skipped video frame that is not encoded and is not included in the bitstream.

9. A digital video encoding apparatus comprising:
an interpolation module that interpolates a frame rate up-conversion (FRUC) video frame;
a mode selection module that selects one of a plurality of FRUC modes for encoding at least a portion of an encoded video frame, wherein each FRUC mode of the plurality of FRUC modes is associated with encoding different types of motion compensation information;
an encoding module that encodes the at least a portion of the video frame based on the selected FRUC mode and using the FRUC frame as a reference;
a signaling module that adjusts one or more parameters for the at least a portion in the encoded video frame to indicate the selected FRUC mode; and
wherein the signaling module is configured to generate a bitstream that includes the encoded video frame, wherein the bitstream does not include the FRUC frame.

10. The apparatus of claim 9, wherein the mode selection module selects one of a plurality of FRUC modes for at least one of a plurality of blocks within the encoded video frame, and the signaling module adjusts one or more parameters associated with each of the blocks to indicate the selected FRUC mode for the respective blocks.

11. The apparatus of claim 10, wherein the signaling module adjusts a coded block pattern (CBP) parameter and a motion vector (MV) parameter for each of the blocks to indicate the selected FRUC mode.

12. The apparatus of claim 11, wherein the signaling module sets the CBP parameter to zero and the MV parameter to zero to indicate a first FRUC mode, sets the CBP parameter to zero and the MV parameter to a nonzero value to indicate a second FRUC mode, sets the CBP parameter to a nonzero value and the MV parameter to zero to indicate a third FRUC mode, and sets the CBP parameter to a nonzero value and the MV parameter to a nonzero value to indicate a fourth FRUC mode.

13. The apparatus of claim 9, wherein the mode selection module selects one of the FRUC modes based on a rate distortion optimization decision.

14. The apparatus of claim 9, wherein the encoding module includes mode information representing the different types of motion compensation information in the encoded video frame, wherein the mode information comprises no residual information and no motion vector information for a first FRUC mode, motion vector information for a second FRUC mode, residual information for a third FRUC mode, and both residual information and motion vector information for a fourth FRUC mode.

15. A processor for encoding digital video data, the processor being configured to interpolate a frame rate up-conversion (FRUC) video frame, select one of a plurality of FRUC modes for encoding at least a portion of an encoded video frame, wherein each FRUC mode of the plurality of FRUC modes is associated with encoding different types of motion compensation information, encode, using the processor, the at least a portion of the video frame based on the selected FRUC mode and using the FRUC frame as a reference, adjust one or more parameters for the at least a portion of the encoded video frame to indicate the selected FRUC mode, and generate a bitstream that includes the encoded video frame, wherein the bitstream does not include the FRUC frame.

16. A computer program product for digital video encoding comprising a non-transitory computer-readable medium storing instructions that, when executed, cause one or more processors to:
interpolate a frame rate up-conversion (FRUC) video frame;
select one of a plurality of FRUC modes for encoding at least a portion of an encoded video frame, wherein each FRUC mode of the plurality of FRUC modes is associated with encoding different types of motion compensation information;

encode, using the processor, the at least a portion of the video frame based on the selected FRUC mode and using the FRUC frame as a reference;

adjust one or more parameters for the at least a portion of the encoded video frame to indicate the selected FRUC mode; and generate a bitstream that includes the encoded video frame, wherein the bitstream does not include the FRUC frame.

17. A digital video encoding apparatus comprising:
means for interpolating a frame rate up-conversion (FRUC) video frame;
means for selecting one of a plurality of FRUC modes for encoding at least a portion of an encoded video frame, wherein each FRUC mode of the plurality of FRUC modes is associated with encoding different types of motion compensation information;
means for encoding, using the processor, the at least a portion of the video frame based on the selected FRUC mode and using the FRUC frame as a reference;
means for adjusting one or more parameters for the at least a portion of the encoded video frame to indicate the selected FRUC mode; and
means for generating a bitstream that includes the encoded video frame, wherein the bitstream does not include the FRUC frame.

18. The apparatus of claim 17, wherein the means for selecting one of a plurality of FRUC modes comprises means for selecting one of a plurality of FRUC modes for at least one of a plurality of blocks within the encoded video frame, and the means for adjusting one or more parameters comprises means for adjusting one or more parameters associated with each of the blocks to indicate the selected FRUC mode for the respective blocks.

19. The apparatus of claim 18, wherein the means for adjusting one or more parameters comprises means for adjusting a coded block pattern (CBP) parameter and a motion vector (MV) parameter for each of the blocks to indicate the selected FRUC mode.

20. The apparatus of claim 19, further comprising means for setting the CBP parameter to zero and the MV parameter to zero to indicate a first FRUC mode, means for setting the CBP parameter to zero and the MV parameter to nonzero to indicate a second FRUC mode, means for setting the CBP parameter to nonzero and the MV parameter to zero to indicate a third FRUC mode, and means for setting the CBP parameter to nonzero and the MV parameter to nonzero to indicate a fourth FRUC mode.

21. The apparatus of claim 17, wherein the means for selecting one of a plurality of FRUC modes comprises means for selecting one of the FRUC modes based on a rate distortion optimization decision.

22. A digital video decoding method comprising:
obtaining an encoded video frame from a bitstream;
interpolating, using a processor, a frame rate up-conversion (FRUC) video frame, wherein the bitstream does not include the FRUC frame;
selecting, using the processor, one of a plurality of FRUC modes for decoding at least a portion of the encoded video frame based on one or more parameters for the at least a portion of the encoded video frame that indicate the selected FRUC mode, wherein each FRUC mode of the plurality of FRUC modes is associated with decoding different types of motion compensation information; and
decoding, using the processor, the at least a portion of the encoded video frame according to the selected FRUC mode using the interpolated FRUC frame as a reference.

23. The method of claim 22, wherein selecting one of a plurality of FRUC modes comprises selecting one of a plurality of FRUC modes for at least one of a plurality of blocks within the encoded video frame, wherein one or more parameters associated with each of the blocks indicates the selected FRUC mode for the respective blocks.

24. The method of claim 23, wherein the parameters that indicate the selected FRUC mode comprise a coded block pattern (CBP) parameter and a motion vector (MV) parameter for each of the blocks.

25. The method of claim 24, wherein the CBP parameter is set to zero and the MV parameter set to zero to indicate a first FRUC mode, the CBP parameter is set to zero and the MV parameter is set to nonzero to indicate a second FRUC mode, the CBP parameter is set to nonzero and the MV parameter is set to zero to indicate a third FRUC mode, and the CBP parameter is set to nonzero and the MV parameter is set to nonzero to indicate a fourth FRUC mode.

26. The method of claim 22, wherein the encoded video frame includes mode information representing the different types of motion compensation information, wherein the mode information comprises no residual information and no motion vector information for a first FRUC mode, motion vector information for a second FRUC mode, residual information for a third FRUC mode, and both residual information and motion vector information for a fourth FRUC mode.

27. The method of claim 22 wherein the interpolating a FRUC video frame is performed from frames in the same view previous and subsequent to the yet to be interpolated FRUC video frame.

28. The method of claim 22, wherein the FRUC video frame is interpolated to include content of a skipped video frame that is not obtained from the bitstream and is not decoded.

29. A digital video decoding apparatus comprising:
a decoding module configured to obtain an encoded video frame from a bitstream;
an interpolation module that interpolates a frame rate up-conversion (FRUC) video frame, wherein the bitstream does not include the FRUC frame;
a mode selection module that selects one of a plurality of FRUC modes for decoding at least a portion of the encoded video frame based on one or more parameters for the at least a portion of the encoded video frame that indicate the selected FRUC mode, wherein each FRUC mode of the plurality of FRUC modes is associated with decoding different types of motion compensation information; and
wherein the decoding module decodes the at least a portion of the encoded video frame according to the selected FRUC mode using the interpolated FRUC frame as a reference.

30. The apparatus of claim 29, wherein the mode selection module selects one of a plurality of FRUC modes for at least one of a plurality of blocks within the encoded video frame, wherein one or more parameters associated with each of the blocks indicates the selected FRUC mode for the respective blocks.

31. The apparatus of claim 30, wherein the parameters that indicate the selected FRUC mode comprise a coded block pattern (CBP) parameter and a motion vector (MV) parameter for each of the blocks.

32. The apparatus of claim 31, wherein the CBP parameter is set to zero and the MV parameter set to zero to indicate a first FRUC mode, the CBP parameter is set to zero and the MV parameter is set to nonzero to indicate a second FRUC mode, the CBP parameter is set to nonzero and the MV parameter is set to zero to indicate a third FRUC mode, and the CBP parameter is set to nonzero and the MV parameter is set to nonzero to indicate a fourth FRUC mode.

33. The apparatus of claim 29, wherein the encoded video frame includes mode information representing the different types of motion compensation information, wherein the mode information comprises no residual information and no motion vector information for a first FRUC mode, motion vector information for a second FRUC mode, residual information for a third FRUC mode, and both residual information and motion vector information for a fourth FRUC mode.

34. A processor for decoding digital video data, the processor being configured to:
   obtain an encoded video frame from a bitstream;
   interpolate a frame rate up-conversion (FRUC) video frame, wherein the bitstream does not include the FRUC frame;
   select one of a plurality of FRUC modes for decoding at least a portion of the encoded video frame based on one or more parameters for the at least a portion of the encoded video frame that indicate the selected FRUC mode, wherein each FRUC mode of the plurality of FRUC modes is associated with decoding different types of motion compensation information; and
   decode the at least a portion of the encoded video frame according to the selected FRUC mode using the interpolated FRUC frame as a reference.

35. A computer program product for digital video decoding comprising a non-transitory computer-readable medium storing instructions that, when executed, cause one or more processors to:
   obtain an encoded video frame from a bitstream;
   interpolate a frame rate up-conversion (FRUC) video frame, wherein the bitstream does not include the FRUC frame;
   select one of a plurality of FRUC modes for decoding at least a portion of the encoded video frame based on one or more parameters for the at least a portion of the encoded video frame that indicate the selected FRUC mode, wherein each FRUC mode of the plurality of FRUC modes is associated with decoding different types of motion compensation information; and
   decode the at least a portion of the encoded video frame according to the selected FRUC mode using the interpolated FRUC frame as a reference.

36. A digital video decoding apparatus comprising:
   means for obtaining an encoded video frame from a bitstream;
   means for interpolating a frame rate up-conversion (FRUC) video frame, wherein the bitstream does not include the FRUC frame;
   means for selecting one of a plurality of FRUC modes for decoding at least a portion of the encoded video frame based on one or more parameters for the at least a portion of the encoded video frame that indicate the selected FRUC mode, wherein each FRUC mode of the plurality of FRUC modes is associated with decoding different types of motion compensation information; and
   means for decoding the at least a portion of the encoded video frame according to the selected FRUC mode using the interpolated FRUC frame as a reference.

37. The apparatus of claim 36, wherein the means for selecting one of a plurality of FRUC modes comprises means for selecting one of a plurality of FRUC modes for at least one of a plurality of blocks within the encoded video frame, and wherein one or more parameters associated with each of the blocks indicates the selected FRUC mode for the respective blocks.

38. The apparatus of claim 37, wherein the parameters that indicate the selected FRUC mode comprise a coded block pattern (CBP) parameter and a motion vector (MV) parameter for each of the blocks.

39. The apparatus of claim 38, wherein the CBP parameter is set to zero and the MV parameter set to zero to indicate a first FRUC mode, the CBP parameter is set to zero and the MV parameter is set to nonzero to indicate a second FRUC mode, the CBP parameter is set to nonzero and the MV parameter is set to zero to indicate a third FRUC mode, and the CBP parameter is set to nonzero and the MV parameter is set to nonzero to indicate a fourth FRUC mode.

40. The apparatus of claim 36, wherein the encoded video frame includes mode information representing the different types of motion compensation information, wherein the mode information comprises no residual information and no motion vector information for a first FRUC mode, motion vector information for a second FRUC mode, residual information for a third FRUC mode, and both residual information and motion vector information for a fourth FRUC mode.

* * * * *